United States Patent
Wang et al.

(10) Patent No.: US 11,356,928 B2
(45) Date of Patent: Jun. 7, 2022

(54) METHODS AND SYSTEMS FOR REDUCING SYSTEM INFORMATION (SI) ACQUISITION TIME

(71) Applicant: Telefonaktiebolaget LM Ericsson (publ), Stockholm (SE)

(72) Inventors: Yi-Pin Eric Wang, Fremont, CA (US); Johan Bergman, Stockholm (SE); Andreas Höglund, Solna (SE); Olof Liberg, Stockholm (SE); Antti Ratilainen, Espoo (FI); Yutao Sui, Solna (SE); Tuomas Tirronen, Helsinki (FI); Anders Wallén, Ystad (SE); Emre Yavuz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/611,045

(22) PCT Filed: May 3, 2018

(86) PCT No.: PCT/IB2018/053092
§ 371 (c)(1),
(2) Date: Nov. 5, 2019

(87) PCT Pub. No.: WO2018/203281
PCT Pub. Date: Nov. 8, 2018

(65) Prior Publication Data
US 2020/0252858 A1     Aug. 6, 2020

Related U.S. Application Data

(60) Provisional application No. 62/515,732, filed on Jun. 6, 2017, provisional application No. 62/502,423, filed on May 5, 2017.

(51) Int. Cl.
*H04W 48/10* (2009.01)

(52) U.S. Cl.
CPC .................................. *H04W 48/10* (2013.01)

(58) Field of Classification Search
CPC ............................. H04W 48/10; H04W 48/08
(Continued)

(56) References Cited

U.S. PATENT DOCUMENTS

| | | | |
|---|---|---|---|
| 8,270,388 B2 * | 9/2012 | Chmiel | H04W 48/12 370/345 |
| 9,001,723 B1 | 4/2015 | Singh et al. | |

(Continued)

FOREIGN PATENT DOCUMENTS

| | | |
|---|---|---|
| CN | 101542915 A | 9/2009 |
| CN | 104871446 A | 8/2015 |

(Continued)

OTHER PUBLICATIONS

QUALCOMM Incorporated, "Reduced system acquisition time", 3GPP TSG RAN WG1 Meeting #88bis; R1-1705011; Spokane, USA Apr. 3-7, 2017. (3 pages).

(Continued)

*Primary Examiner* — Michael Y Mapa

(57) ABSTRACT

Enabling a UE to determine whether the UE can skip the acquisition of SIB1-BR. An indication (e.g., a one bit flag) in the MIB is provided, which indication is set to a particular value if the UE needs to read SIB1-BR, otherwise the indication is set to a different value indicating that the UE can skip reading SIB1-BR assuming other conditions are met (e.g., assuming that the UE has previously read SIB1-BR within a MIB indication time period).

7 Claims, 11 Drawing Sheets

(58) Field of Classification Search
USPC .............. 455/434, 414.1–414.2, 450–452.1;
370/252
See application file for complete search history.

(56) References Cited

U.S. PATENT DOCUMENTS

| | | | | |
|---|---|---|---|---|
| 2011/0237239 | A1* | 9/2011 | Chou | H04W 48/08 455/422.1 |
| 2013/0303199 | A1* | 11/2013 | Siomina | H04L 5/0005 455/456.5 |
| 2014/0321343 | A1* | 10/2014 | Gupta | H04L 65/608 370/311 |
| 2015/0223148 | A1* | 8/2015 | Shi | H04W 52/0216 370/312 |
| 2015/0256995 | A1* | 9/2015 | Rune | H04W 8/186 455/418 |
| 2015/0304925 | A1* | 10/2015 | Hwang | H04J 11/005 370/331 |
| 2016/0057717 | A1* | 2/2016 | Liberg | H04W 56/00 370/350 |
| 2016/0212686 | A1* | 7/2016 | Viorel | H04W 4/70 |
| 2017/0311250 | A1* | 10/2017 | Rico Alvarino | H04W 48/18 |
| 2018/0049022 | A1* | 2/2018 | Johansson | H04W 8/24 |
| 2018/0139625 | A1* | 5/2018 | Breuer | H04W 4/70 |
| 2020/0068477 | A1* | 2/2020 | Awada | H04W 48/08 |

FOREIGN PATENT DOCUMENTS

| | | |
|---|---|---|
| CN | 105518628 A | 4/2016 |
| CN | 105993192 A | 10/2016 |
| JP | 2011-239376 A | 11/2011 |
| JP | 2016-528846 A | 9/2016 |
| JP | 2017-505070 A | 2/2017 |
| KR | 10-2016-0135099 A | 11/2016 |
| RU | 2446631 C2 | 3/2012 |
| RU | 2474962 C2 | 2/2013 |
| RU | 2 577 763 C2 | 7/2015 |
| WO | 2016/153548 A1 | 9/2016 |
| WO | 2016/186696 A1 | 11/2016 |

OTHER PUBLICATIONS

Intel Corporation, "System Information change", 3GPP TSG RAN WG2 NB-IOT ad-hoc Meeting; R2-160447; Budapest, Hungary, Jan. 19-21, 2016. (3 pages).

Intel Corporation, "System information modification for Release-13 low complexity UEs and enhanced coverage", 3GPP TSG RAN WG2 Meeting #91 bis; R2-154378; Malmo, Sweden, Oct. 5-9, 2015. (5 pages).

Zte, "Discussion on system acquisition time reduction for MTC", 3GPP TSG RAN WG1 Meeting #89; R1-1707090; Hangzhou, China, May 15-19, 2017. (8 pages).

Sierra Wireless S.A., "Email discussion report [99#46] [MTC] Skipping SIB1-BR" 3GPP TSG RAN WG2 Meeting #99bis; R2-1711477; Prague, Czech Republic, Oct. 9-13, 2017. (15 pages).

Sierra Wireless S.A., "SIB validity indication in MIB", 3GPP TSG-RAN WG2 #99; R2-1708232; Berlin, Germany, Aug. 2017. (2 pages).

Ericsson, "Skipping SIB1-BR acquisition", 3GPP TSG-RAN WG2 #99bis; R2-1710519; Prague, Czech Republic, Oct. 9-13, 2017. (6 pages).

Ericsson, "Skipping SIB1-BR acquisition", 3GPP TSG-RAN WG2 #101; R2-1803071; Athens, Greece, Feb. 26-Mar. 2, 2018. (5 pages).

International Search Report and Written Opinion dated Sep. 13, 2018 issued in International Application No. PCT/IB2018/053092. (17 pages).

Huawei et al., "New WID on Further NB-IoT enhancements", 3GPP TSG RAN Meeting #75; RP-170852; Dubrovnik, Croatia, Mar. 6-9, 2017. (6 pages).

Ericsson et al., "New WID on Even further enhanced MTC for LTE", 3GPP TSG RAN Meeting #75; RP-170732; Dubrovnik, Croatia, Mar. 6-9, 2017. (4 pages).

3GPP TSG-RAN WG4 Meeting #81; R4-1610972; Reno, USA, Nov. 14-18, 2016. (2 pages).

3GPP TSG-RAN WG4 Meeting #81; R4-1610970; Reno, USA, Nov. 14-18, 2016 .(1 page).

3GPP TS 36.331 V14.0.0 (Sep. 2016); 3rd Generation Partnership Project; Technical Specification Group Radio Access Network; Evolved Universal Terrestrial Radio Access (E-UTRA); Radio Resource Control (RRC); Protocol specification (Release 14); Sep. 2016. (644 pages).

Ericsson, "Reduced system acquisition time for NB-IoT", 3GPP TSG RAN #89; R1-1706894; Hangzhou, China May 15-19, 2017. (5 pages).

Ericsson, "On system acquisition time reduction", 3GPP TSG-RAN1#88bis R1 -1705188, Spokane Washington, USA, Apr. 3-7, 2017 (7 pages).

Ericson et al., "Way forward on simulation assumptions for reduced system acquisition time", 3GPP TSG RAN WG1 Meeting #88bis, R1-1706583, Spokane, USA, Agenda 7.2.6.1, Apr. 3-7, 2017 (4 pages).

Sequans Communications, "Paging on a non-anchor carrier", 3GPP TSG-RAN WG2 #95, R2-165553, Gothenburg, Sweden, Aug. 22-26, 2016 (5 pages).

Intel Corporation, "System information modification for Release-13 low complexity UEs and enhanced coverage", 3GPP TSG RAN WG2 Meeting #91 bis, Malmö, Sweden, Oct. 5-9, 2015, pp. 1-5, R2-154378, 3GPP.

Ericsson, "System Information Broadcast for NB-IOt", 3GPP TSG RAN WG2 #91bis, Malmo, Sweden, Oct. 5-9, 2015, pp. 1-5, Tdoc R2-154170, 3GPP.

Huawei et al., "Skip system information reading for MTC", 3GPP TSG RAN WG2 #99 Meeting, Berlin, Germany, Aug. 21-25, 2017, pp. 1-4, R2-1709337, 3GPP.

Huawei et al., "System information design", 3GPP TSG-RAN2 Meeting #94, Nanjing, China, May 23-27, 2016, pp. 1-5, R2-164127, 3GPP.

* cited by examiner

METHODS AND SYSTEMS FOR REDUCING SYSTEM INFORMATION (SI) ACQUISITION TIME

CROSS REFERENCE TO RELATED APPLICATION(S)

This application is a 35 U.S.C. § 371 National Stage of International Patent Application No. PCT/IB2018/053092, filed May 3, 2018, designating the United States and claiming priority to: i) U.S. provisional application No. 62/502,423, filed on filed on May 5, 2017 and ii) U.S. provisional application No. 62/515,732 filed on Jun. 6, 2017. The above identified applications are incorporated by this reference.

TECHNICAL FIELD

Disclosed are embodiments related to reducing system information (SI) acquisition time by a user equipment (UE) (e.g., an Internet-of-Things (IoT) device, a machine-type-communication (MTC) device, or other communication device), such as, for example, a UE that is waking up from deep sleep state.

BACKGROUND

Generally, in order for a UE to be able to communicate with a network the UE must obtain some system information (SI). Typically, a base station periodically broadcasts a Master Information Block (MIB) that contains SI that is needed by a UE. The base station also transmits different System Information Blocks (SIBs) that may also contain further SI that is needed by the UE. For example, an LTE-M1 base station transmits, for example, a particular SIB that is referred to as "SIB1-BR."

There has been a lot of work in 3GPP lately on specifying technologies to cover Machine-to-Machine (M2M) and/or Internet of Things (IoT) related use cases. Most recent work for 3GPP Release 13 includes enhancements to support Machine-Type Communications (MTC) with a new UE category M1 (Cat-M1), supporting reduced maximum bandwidth of up to 6 physical resource blocks (PRBs), and Narrowband IoT (NB-IoT) work item specifying a new radio interface (and UE category NB1, Cat-NB1).

We will refer to the LTE enhancements introduced in 3GPP Release 13 for MTC as "eMTC", and the further enhancements introduced in 3GPP Release 14 as "FeMTC" including (not limiting) support for bandwidth limited UEs, Cat-M1, Cat-M2, and support for coverage enhancements. This is to separate discussion from NB-IoT, although the supported features are similar on a general level.

There are multiple differences between "legacy" LTE and the procedures and channels defined for eMTC or FeMTC work (likewise for NB-IoT). Some important differences include new physical channels, such as the physical downlink control channels (PDCCH), called MPDCCH in eMTC and NPDCCH in NB-IoT, and a new physical random access channel, NPRACH, for NB-IoT.

For system information (SI) (both eMTC and NB-IoT) there is no dynamic scheduling of either SIB1-BR/SIB1-NB (scheduling information included in MIB/MIB-NB), or system information messages (fixed scheduling inside system information window provided in SIB1-BR/SIB1-NB). Both eMTC and NB-IoT support coverage enhancements, and the UE may have to accumulate several repetitions of system information broadcast in order to be able to successfully decode it. This means that system information acquisition time will in practice be longer the worse coverage the UE is in. In order to combat this, more dense repetitions for some physical channels and system information was introduced in eMTC and NB-IoT Release 13. The drawback of this is an increase in system overhead (i.e., more radio resources are consumed by continuous ("always-on") control signaling broadcast). The system acquisition procedure is in general the same for eMTC and NB-IoT as for LTE: the UE first achieves downlink synchronization by reading PSS/SSS, then the UE reads the MIB, then SIB1 (e.g., SB1-BR), and finally the SI-messages are acquired (each possibly containing multiple SIBs).

At the 3GPP RAN #70 meeting, a new Release 13 work item named Narrowband IoT (NB-IoT) was approved. The objective is to specify a radio access for cellular internet of things (IoT) that addresses improved indoor coverage, support for massive number of low throughput devices, not sensitive to delay, ultra-low device cost, low device power consumption and (optimized) network architecture.

For NB-IoT, three different operation modes are defined, i.e., stand-alone, guard-band, and in-band. In stand-alone mode, the NB-IoT system is operated in dedicated frequency bands. For in-band operation, the NB-IoT system can be placed inside the frequency bands used by the current LTE system, while in the guard-band mode, the NB-IoT system can be operated in the guard band used by the current (legacy) LTE system. NB-IoT can operate with a system bandwidth of 180 kHz. When multiple carriers are configured, several 180 kHz carriers can be used, e.g., for increasing the system capacity, inter-cell interference coordination, load balancing, etc.

In order to adapt to certain use cases that requires more capacity than usual, e.g., software or firmware upgrade, multi-carrier operations are used. The NB-IoT device listens to the system information on the anchor carrier, but when there is data, the communication can be moved to a secondary carrier.

SUMMARY

During Release 14, some potential problems related to long system information acquisition time were identified by RAN4. Reducing the system acquisition time is also one of the agreed work item objectives for Release 15 for eMTC. More specifically, RAN1 generally outlines some areas in which RAN2 could provide improvements (on top of the considered RAN1 improvements). In principle, this is just raising the question to RAN2 whether some SI broadcast messages could be skipped by the UE in some situations, and the case of most interest here is skipping SIB1-BR reading). For reference, the content of the LTE-M MIB is shown below in Table 1:

TABLE 1

| MasterInformationBlock ::= | SEQUENCE { |
|---|---|
| dl-Bandwidth | ENUMERATED { |
| | n6, n15, n25, n50, n75, n100}, |
| phich-Config | PHICH-Config, |
| systemFrameNumber | BIT STRING (SIZE (8)), |
| schedulingInfoSIB1-BR-r13 | INTEGER (0..31), |
| spare | BIT STRING (SIZE (5)) |
| } | |

The most noticeable difference to NB-IoT is that, in NB-IoT, the valueTag is not present in MIB but is instead located in SIB1-BR.

There currently exist certain challenge(s). The SIB1-BR contains the following: i) access information, ii) system information valueTag, iii) hyper system frame number (H-SFN), iv) a bitmap indicating the valid subframes, v) the starting OFDM symbol for MPDCCH and PDSCH (essentially replacing PCFICH), and vi) scheduling information of other SI messages.

Due to the access-related info, valid subframe indication, etc. it is very difficult or even impossible for UEs to skip reading SIB1-BR for initial acquisition. However, for re-acquisition of SI it could be a viable option, e.g. for UEs waking up from eDRX or PSM. In most cases, SI has not changed in the cell, but the UE must still ensure this is the case by reading the system information valueTag. One approach would therefore be to put the valueTag directly in MIB. However, this is problematic for several reasons. First, the valueTag is 5 bits, but there are only 5 spare bits left in MIB. It is highly unlikely that eMTC is allowed by 3GPP to use up all the remaining spare bits intended for any future use for LTE in general. Moreover, some of the MIB spare bits will likely be used for other purposes, still related to 'reduced system acquisition time' e.g. to have the access barring enabled flag (ab-Enabled) in MIB as for NB-IoT. Another problem with including the valueTag in the MIB is that this will result in broadcasting redundant information, in worst case 5 bits, increasing the system overhead. Another approach is to use fewer bit for the valueTag (e.g., 2 bits instead of 5). With 5 bits the network can update the system information up to 32 times during the SI validity time of 3 h or 24 h (this is up to the configuration). If a valueTag of fewer than 5 bits is used instead, this means that the network will be restricted to change SI fewer than 32 times (e.g., 2 or 4 times) during the SI validity time. This is a quite intrusive change to legacy operation, e.g. a 2 bit valueTag would mean that the network can only update the SI 4 times during this period.

Certain aspects of the present disclosure and their embodiments provide solutions to these or other challenges. For example, certain embodiments presented herein make use of an indication (e.g., a one bit flag) in the MIB that is set to a particular value if the UE needs to read SIB1-BR, otherwise the MIB indication is set to a different value. This MIB indication is unlike a valueTag in the sense that upon any change of the SIB1-BR and the systemInfoValueTag therein, in the simplest case of using 1 bit the flag is changed from '0' to '1', indicating that UEs can no longer omit reading SIB1-BR, but at a subsequent change of SIB1-BR the flag is still set to '1' for the remainder of a certain time period, e.g. a HSFN cycle. Only using 1 bit (or some other small number) out of the MIB spare bits provides a clear advantage to all UEs when SIB1-BR/systemInfoValueTag is not updated, which is most often the case. If the SI has been updated, UEs will simply follow Release 13 procedures. (Embodiments with multiple bits could have additional benefits as seen in the detail description). The above described solution, which reduces the need for UEs to acquire SIB1-BR (to check system valueTag, etc.) greatly improves system access time and UE battery life.

There are, proposed herein, various embodiments which address one or more of the issues disclosed herein. Certain embodiments may provide one or more of the following technical advantage(s). UEs can skip reading SIB1-BR for SI re-acquisition, thereby improve UE system acquisition/access time and extend UE battery life; and the solution uses only 1 (or few) of the MIB spare bits, thereby efficiently using scarce resources.

These and other embodiments are further described herein.

BRIEF DESCRIPTION OF THE DRAWINGS

The accompanying drawings, which are incorporated herein and form part of the specification, illustrate various embodiments.

DETAILED DESCRIPTION

Figure 1:
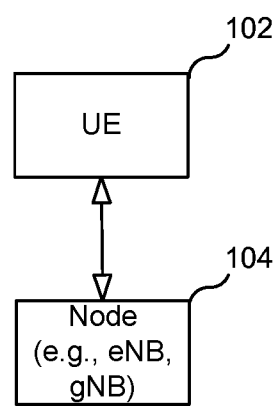
FIG. 1 illustrates an architecture view according to some embodiments.

Cat-M1, Cat-M2, Cat-N1 and Cat-N2 UEs in poor coverage may experience long system acquisition time. It is identified in [3] [4] that in some cases for both NB-IoT and LTE-M (eMTC), it may take long time to acquire the system information. Therefore, one objective for both LTE-M and NB-IoT further enhancements in Rel-15 is to reduce system acquisition time.

In this disclosure, we propose methods and systems that enable a NB-IoT UE to skip acquisition of certain master information (MI) in the master information block (MIB) and/or certain system information (SI) in some system information blocks (SIBs). The proposed methods include the embodiments as follows.

(1) Signal the MIB/SIB validity interval or expiration time in a new system information block (SIB). We will refer to this new SIB as SIB-X, to be differentiated those system information blocks that are already defined for NB-IoT.

(2) Mechanism for allowing a UE skipping MI/SI acquisition to acquire one or more of Access Barring flag, System Information Number, and Hyper System Information number.

A UE can skip reading the master information block (MIB) (or parts thereof) carried in Narrowband Physical Broadcast Channel (NPBCH) or certain System Information Blocks (SIBs) (or parts thereof) carried in Narrowband Physical Downlink Shared Channels (PDSCH), when the essential master information or system information has not been changed since the last time the UE acquires them. Not having to re-acquire up-to-date MI/SI, the UE reduces energy consumption and therefore enjoys longer battery lifetime. Furthermore, the latency of UE establishing access to the network when it has data to send is reduced.

The NB-IoT system information is outlined below:

NB-IoT master information block (MIB-NB) consists of the following information:

Four most significant bits, MSBs, of the SFN.
Two least significant bits, LSBs, of the H-SFN.
Access barring (AB) flag which indicates whether access barring is enabled.
Operation mode (standalone, in-band, guard-band).
In case of in-band and guard-band, the frequency raster offset (±2.5,±7.5 kHz).
Information about System Information Block 1 (SIB1-NB) scheduling.
System information value tag which is essentially a version number of the system information.

NB-IoT further define the following system information types:
SIB1-NB: 8 MSBs of the H-SFN, scheduling information of other system information type, invalid subframe bitmap, plus other information.
SIB2: Radio resource configuration (RRC) information.
SIB3: Cell re-selection information.
SIB4 and SIB5: Neighboring cell related information.
SIB14-NB: Access class barring information per PLMN.
SIB16: Information related to GPS time and Coordinated Universal Time (UTC).

The LTE-M system information is outlined below:
The LTE-M master information block (MIB-NB) consists of the following information:
Downlink bandwidth
PHICH configuration
SFN bits
Scheduling information for SIB1-BR
5 spare bits LTE-M further define the following system information types:
SIB1-BR: Access related information including access class barring (ACB) info, scheduling information for SI messages, hyper-SFN, valid bitframes, MPDCCH frequency hopping information, etc.
SIB2: Radio resource configuration (RRC) information.
SIB3: Cell re-selection information.
SIB4 and SIB5: Neighboring cell related information.
SIB14: Access class barring information per PLMN.
SIB16: Information related to GPS time and Coordinated Universal Time (UTC).

Among these different types of master and system information, only SFN, H-SFN, ACB (LTE-M) and AB flag (NB-IoT), SIB14(-NB) and SIB16 are typically changing more dynamically. The other information is rarely changed. SIB16 is not needed when the UE access the network. SIB14(-NB) is not needed if the AB flag is not set for NB-IoT, or if SIB14 is not scheduled in SIB1-BR for LTE-M. Thus, in most occasions, only SFN, H-SFN, and AB flag (or ACB plus SIB-14 scheduling for LTE-M) need to be acquired.

Since most of MIB and SI rarely changes, one way to allow the UE to skip reacquiring MIB(-NB) and SI that will remain unchanged is to have eNB indicate the validity interval or the expiration time of MIB(-NB) and SI information beforehand. (In the below description, we will assume that changes of the AB flag, SIB14(-NB), SIB16, SFN and H-SFN are not used to determine the MI/SI validity interval or expiration time.) With such indication, if the UE wakes up within the MI/SI validity interval of the version that it has acquired previously, there is no need to reacquire the same information. In such scenarios, the UE only needs to acquire only AB flag, SFN and H-SFN (or ACB plus SIB14 scheduling in SIB1-BR for LTE-M), and not necessarily all other information elements contained in MIB-NB and SIB1-NB. To support this method, there are two issues that need to be addressed.

How does the network signal the MI/SI validity interval or expiration time?

How does the UE acquire AB flag (or ACB plus SIB14 scheduling in SIB1-BR for LTE-M), SFN and H-SFN if it knows that all the other MI/SI information stays the same?

Methods for addressing these issues are described below.
Signal the MI/SI Validity Interval or Expiration Time:

A new system information type can be defined to indicate MI/SI validity interval or expiration time. One possible format is to use GPS time or Coordinated Universal Time (UTC). A UE can acquire GPS and UTC time from SIB16 to establish its real-time clock. A new SIB-X can then be used to indicate the GPS or UTC time that the current MI/SI will expire. The format of SIB-X can be similar to the UTC format used in SIB16. However, in SIB16 the time resolution is 10 ms. For SIB-X, much coarse time resolution can be used to reduce the number of bits needed to represent the UTC time. One possibility is to quantize the UTC time with a resolution equivalent to one or multiple SFN cycles. Also, the UTC time information in SIB16 includes year and month information. For SIB-X, it may not be necessary to include year and month information.

A UE can be notified of an update of SIB-X via SI update notification. Such an update notification may be specific to SIB-X.

UE Acquire AB Flag, SFN and H-SFN:

System acquisition time reduction needs to allow certain configurations to support use cases that requires long battery lifetime (e.g. 10-15 years) and 10 s latency for sending exception report such as alarm signal. However, it is not necessary for a solution to cater for use cases that only transmit data less frequently than once every three days as we believe for such use cases, 15 years battery lifetime can already be achieved without further system acquisition time reduction. Consider 20 ppm oscillator accuracy, the UE clock may be off by approximately ±5120 ms in 3 days. Thus, if the UE comes back to the network after 3 days, it needs to resolve this time ambiguity. This uncertainly window matches the duration of one SFN cycle, and thus it takes 10 bits SFN representation to resolve the time ambiguity. The UE will go through the steps of NPSS and NSSS synchronization, and after these two steps it achieves synchronization to 80-ms framing in the system frame structure, i.e. it acquires the 3 LSBs of SFN. Thus, if the UE skips reading MIB-NB, it needs to get the 7 MSBs bits of SFN to resolve the time ambiguity. Adding the AB flag, overall an 8-bit information needs to be provided to the UE.

There are two alternatives of how a UE can acquire such information. We proposed two alternatives below.

Using NPBCH

The SFN and AB flag are provided in MIB carried in NPBCH. The UE can treat all the other information elements as known and only focus on decoding SFN and AB flag. The known information bits can be used to prune the trellis used in the Viterbi decoder and it is expected that the performance can be significantly improved with trellis pruning. In fact, the UE may also check the SI value tag if the MI/SI validity interval or expiration time information as discussed in Section 5.1 is not provided.

Using Wake-Up or go-to-Sleep Signal

A "go-to-sleep" signal is used to indicate that there will not be any down-link control information (DCI) sent during the NPDCCH/MPDCCH search space that follows. Upon receiving such a signal, the UE goes back to the sleep mode.

However, if the go-to-sleep" signal is not detected, the UE has to stay up to attempt to decode the DCI carried in NPDCCH/MPDCCH.

On the other hand, "wake-up" signal is used to indicate that there will be one or more DCIs during sent in the coming NPDCCH/MPDCCH search space. Upon receiving such a signal, the UE needs to stay up to attempt to decode the DCI carried in NPDCCH/MPDCCH. However, if the "wake-up" signal is not present, the UE can go back to sleep. The "wake-up" signal can be sent in subframe(s) before the starting of NPDCCH/MPDCCH search space or at the beginning of the NPDCCH/MPDCCH search space. Also, the "wake-up" signal does not necessary to occupied one or several entire subframe (s). The signal can use partial of the subframes, either in time or frequency domain, e.g., first several symbols in a slot, or a combination of time or frequency domain.

At the time of this writing there is no decision in 3GPP whether the "go-to-sleep" signal and/or the "wake-up" signal approaches will be adopted. However, the approach described here applies notwithstanding whether one or both of these signal approaches are adopted.

One use case of "go-to-sleep" signal and/or the "wake-up" signal is to provide indication to a UE whether this is a paging DCI coming in the next paging occasion that a UE needs to monitor. Therefore, it is expected the "go-to-sleep" signal and/or the "wake-up" signal should be periodic. In addition to indicating whether there is a paging DCI coming in the next paging occasion that a UE needs to monitor, we can take advantage of the periodicity of the "go-to-sleep" signal and/or the "wake-up" to include either partly of the 8-bits or all the 8-bits can be provided in the "go-to-sleep" signal and/or the "wake-up" signal.

Alternative 1:

All the 8-bit information are provided to all the UEs together with the indication of whether this is a paging DCI coming in the next paging occasion that a group UE needs to monitor. All the UEs can listen to this periodic "go-to-sleep" signal and/or the "wake-up" signal for the information that they are interested, i.e., the 8-bit information provided above. For the UEs that are not being paged in the nearest paging occasion, it can simply ignore the indication of the paging related information.

Alternative 2:

Part of the 8-bit information are provided to the UE together with the indication of whether this is a paging DCI coming in the next paging occasion that a UE needs to monitor. This can be the AB flag, or the timing information.

Alternative 3:

In addition to the timing and AB flag information, the SI value tag which is used to indicate whether SIBs are changed can also be included in the "go-to-sleep" signal and/or the "wake-up" signal. Notice that it is also possible to only include the SI value tag in the "go-to-sleep" signal and/or the "wake-up" signal.

Alternative 4:

In the "go-to-sleep" signal and/or the "wake-up" signal we can further include indications to the UE whether it can skip some of the SIBs and/or the MIB reading when being paged.

Alternative 5:

In the "go-to-sleep" signal and/or the "wake-up" signal we can further include indications to the UE when was the previous time the MIB has changed, e.g., using a time stamp or a version number of other mechanisms. If the UE has the latest version of the MIB, it can skip read the MIB.

Notice that some of the above mentioned alternatives may be combined together to reduce the system acquisition time also.

Extend Modification Period of the MIB and/or SIBs:

In NB-IoT, MasterinformationBlock-NB (MIB-NB) scheduling is fixed with a periodicity of 640 ms and with L1 repetitions in between, i.e. in every sub-frame 0. MIB-NB is sent on NPBCH. The MIB-NB contains:

SFN (4 MSB bits)
H-SFN (2 LSB bits)
schedulingInfoSIB1
systemInfoValueTag (any SIB change other than MIB-NB/SIB14-NB/SIB16-NB)
ab-Enabled (access barring activated/de-activated, SIB14 acquisition)
operationModeInfo Due to the 4 MSB bits of the SFN in MIB-NB, the MIB-NB content is changed every 640 ms. Besides the SFN the modification period equals 40.96 sec.

SIB1-NB scheduling is fixed with a periodicity of 2.56 sec. SIB1-NB is broadcasted in every second sub-frame 4. SIB1-NB is sent on DL SCH. The number of NPDSCH repetitions are indicated in MIB-NB (schedulingInfoSIB1). SIB1-NB has a modification period of 40.96 sec, i.e. only after 40.96 sec the SIB1-NB content may change.

SIBs other than SIB1-NB are sent in SI-messages, which are sent on DL SCH. An SI message may contain one or more SIBs, as indicated in the scheduling info in SIB1-NB.

The content of these other SIBs may change after the BCCH modification period. The BCCH modification period is larger or equal to 40.96 s and indicated in SIB2-NB (modificationPeriodCoeff*defaultPagingCycle). SIB change (content and/or scheduling) is indicated by systemInfoValueTag in MasterinformationBlock-NB or systemInfoValueTagSI in SystemInformationBlockType1-NB.

The Access Barring parameters in SIB14-NB can change at any point in time (section 5.2.1.7 in TS 36.331 [6]), and such change does not impact systemInfoValueTag in MasterinformationBlock-NB or systemInfoValueTagSI in SystemInformationBlockType1-NB.

The content in the other SIBs is not expected to change frequently, except for SIB14-NB during congestion periods.

As the problem identified in [3] is that for some cases it may take longer than 40.96 sec to acquire some of the SIBs, the UE may have difficulties to perform combining efficiently across the modification period boundary.

Therefore, the network would then base on the needs to provide a longer modification period than 40.96 sec a UE can assume when decoding MIB-NB, SIB1-NB and SIB2-NB. Recall that BCCH modification period is indicated in SIB2-NB. Certainly, new values can be defined and signal to the UE. Considering the backward compatible issue, the network can configure the new values in a multiple of 40.96 sec. This would not have impact on legacy NB-IoT UEs, which would still assume a modification period of 40.96 sec for MIB-NB and SIB1-NB.

Alternative 1:

Since there are several spare bits in the MIB-NB, we can use some of the spare bits to indicate whether the modification period of 40.96 sec is extended, e.g., in a multiple of the 40.96 sec or other values that the network prefers.

Alternative 2:

We can use one of the SIBs to indicate whether the modification period of 40.96 sec is extended is extended, e.g., in a multiple of the 40.96 sec or other values that the network prefers.

Alternative 3:

We can use one of the dedicated signaling to a specific group of UEs to indicate whether the modification period of 40.96 sec is extended, e.g., in a multiple of the 40.96 sec or other values that the network prefers.

Alternative 4:

Other methods to indicate whether the modification period 40.96 sec is extended, e.g., in a multiple of the 40.96 sec or other values that the network prefers.

In addition to the alternative listed above, in order to provide flexibility at the network, the network would also inform the UEs if the extended modification period is active or not.

Notice that the approach listed above is discussed in the context of NB-IoT, but can also be applied to LTE-M, which has a different modification period.

As shown in FIG. 1, a UE 102 may be in communication with a network node 104 (e.g., a base station, such as, for example, an LTE base station ("eNB") or 5 G base station ("gNB")). For example, UE 102 may communicate with network node 104 using M2M, MTC, or IoT type communication patterns. UE 102 may transition to sleep mode in which it does not actively communicate with network node 104 and may, when prompted by network node 104 or on its own initiative, wake up from its sleep mode and begin communication with network node 104 once more.

Figure 2:
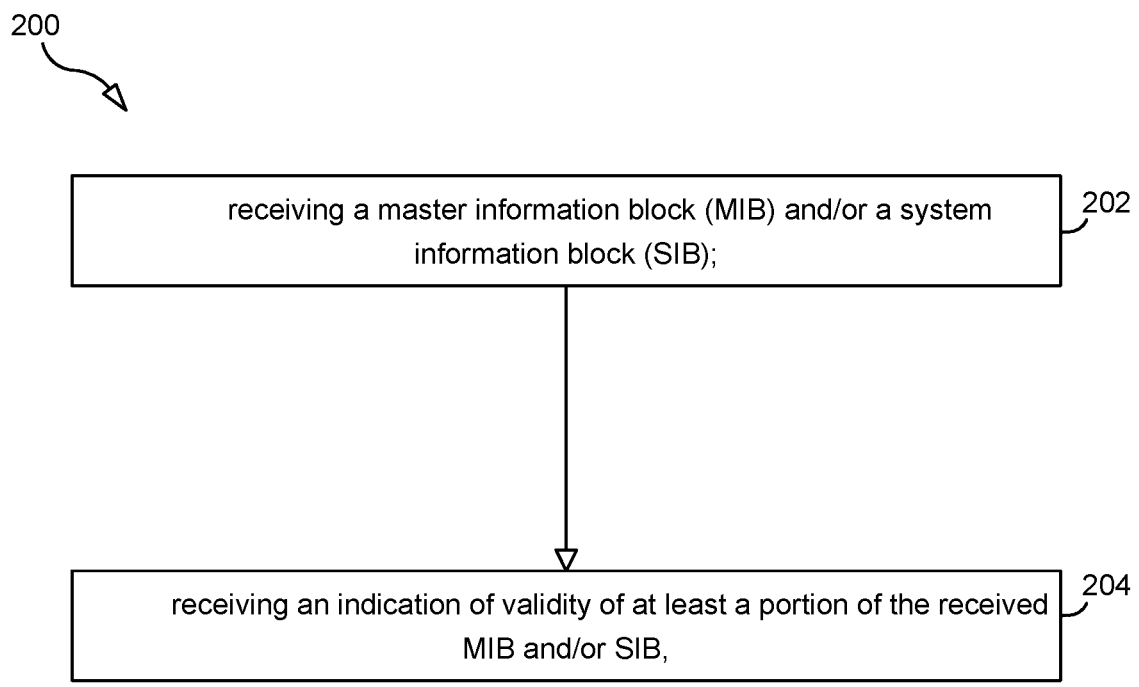
FIG. 2 is a flow chart illustrating a process according to some embodiments.

FIG. 2 illustrates a method 200, which may be implemented on UE 102. UE 102 receives a master information block (MIB) and/or a system information block (SIB) (step 202). UE 102 receives an indication of validity of at least a portion of the received MIB and/or SIB (step 204). The MIB is carried in a Narrowband Physical Broadcast Channel (NPBCH), the SIB is carried in a Narrowband Physical Downlink Shared Channel (PDSCH), and the indication indicates a validity interval or expiration time.

According to some embodiments, the indication is in GPS or UTC time format, and/or the indication is quantized with a resolution equivalent to a multiple of System Frame Number (SFN) cycles. In some embodiments, the method further includes receiving an update notification. In some embodiments, receiving the indication comprising receiving a system information block (SIB) comprising the indication.

In some embodiments, the method further includes storing said at least a portion of the MIB; after storing said at least a portion of the MIB, entering a sleep state; after entering the sleep state, waking up from the sleep state; and as a result of waking up from the sleep state, determining, based on the validity indication, whether the stored portion of the MIB is still valid.

In some embodiments, the method further includes, as a result of determining that the stored portion of the MIB is still valid, receiving a second MIB carried on the NPBCH and skipping decoding one or more portions of the received second MIB but decoding one or more other portions of the received second MIB. In some embodiments, the second MIB comprises encoded operating mode information indicating an operation mode and encoded access barring (AB) flag, the UE decodes the encoded AB flag, and the UE skips the decoding of the operating mode information.

Figure 3:
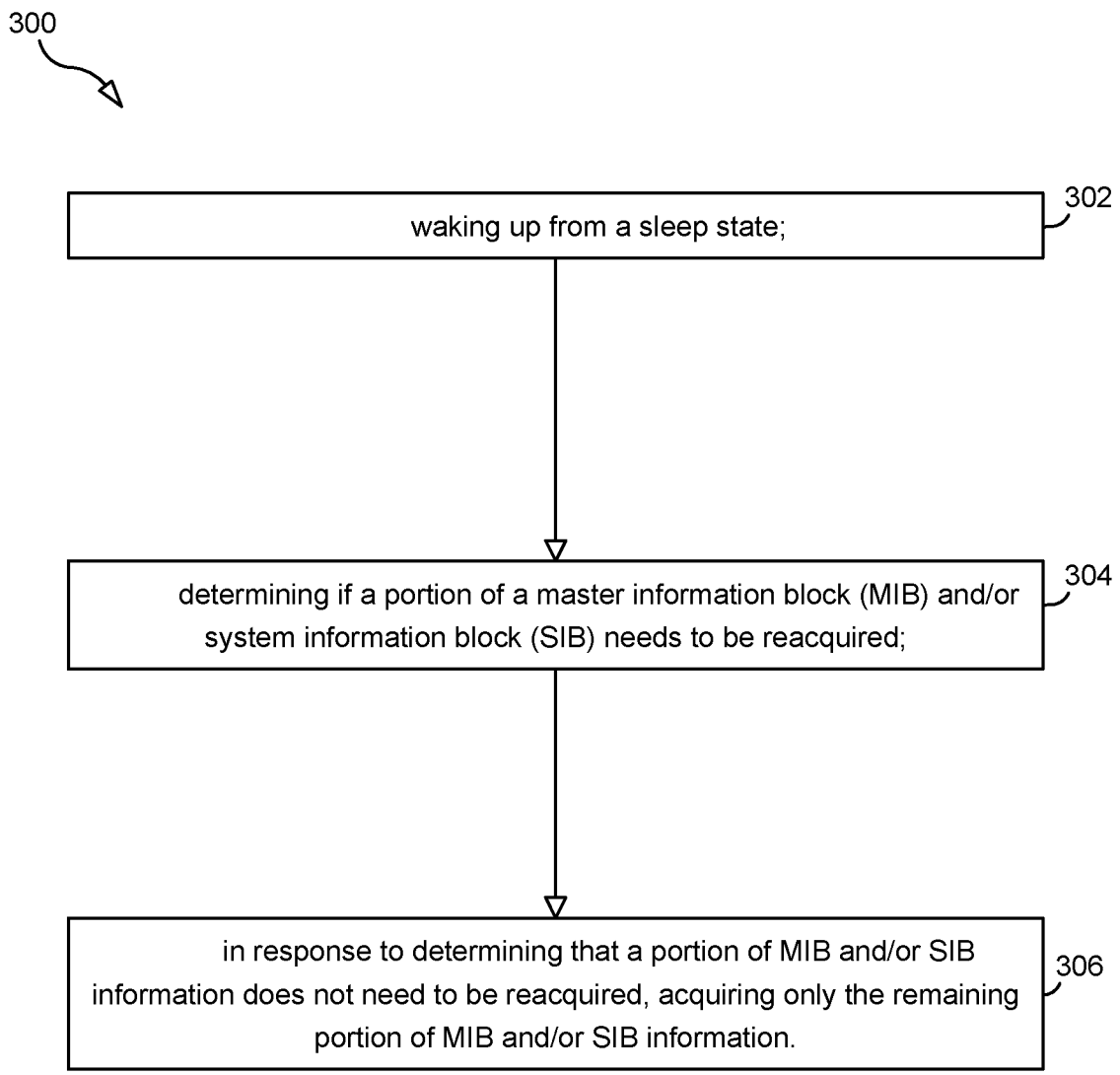
FIG. 3 is a flow chart illustrating a process according to some embodiments.

FIG. 3 illustrates a method 300, which may be implemented on UE 102. UE 102 wakes up from a sleep state (step 302). UE 102 determines if a portion of a master information block (MIB) and/or system information block (SIB) needs to be reacquired (step 304). UE 102, in response to determining that a portion of MIB and/or SIB information does not need to be reacquired, acquires only the remaining portion of MIB and/or SIB information (step 306).

In some embodiments, the remaining portion includes System Frame Number (SFN) and Access Barring (AB) flag information. In some embodiments, acquiring only the remaining portion of MI and/or SI information includes decoding a Master Information Block (MIB) carried on the Narrowband Physical Broadcast Channel (NPBCH), and may further include using the portion of MI and/or SI that does not need to be reacquired to prune the trellis used in the Viterbi decoder.

In some embodiments, a "wake-up" signal and/or a "go-to-sleep" signal is used to indicate whether Downlink Control Information (DCI) will be sent.

Figure 4:
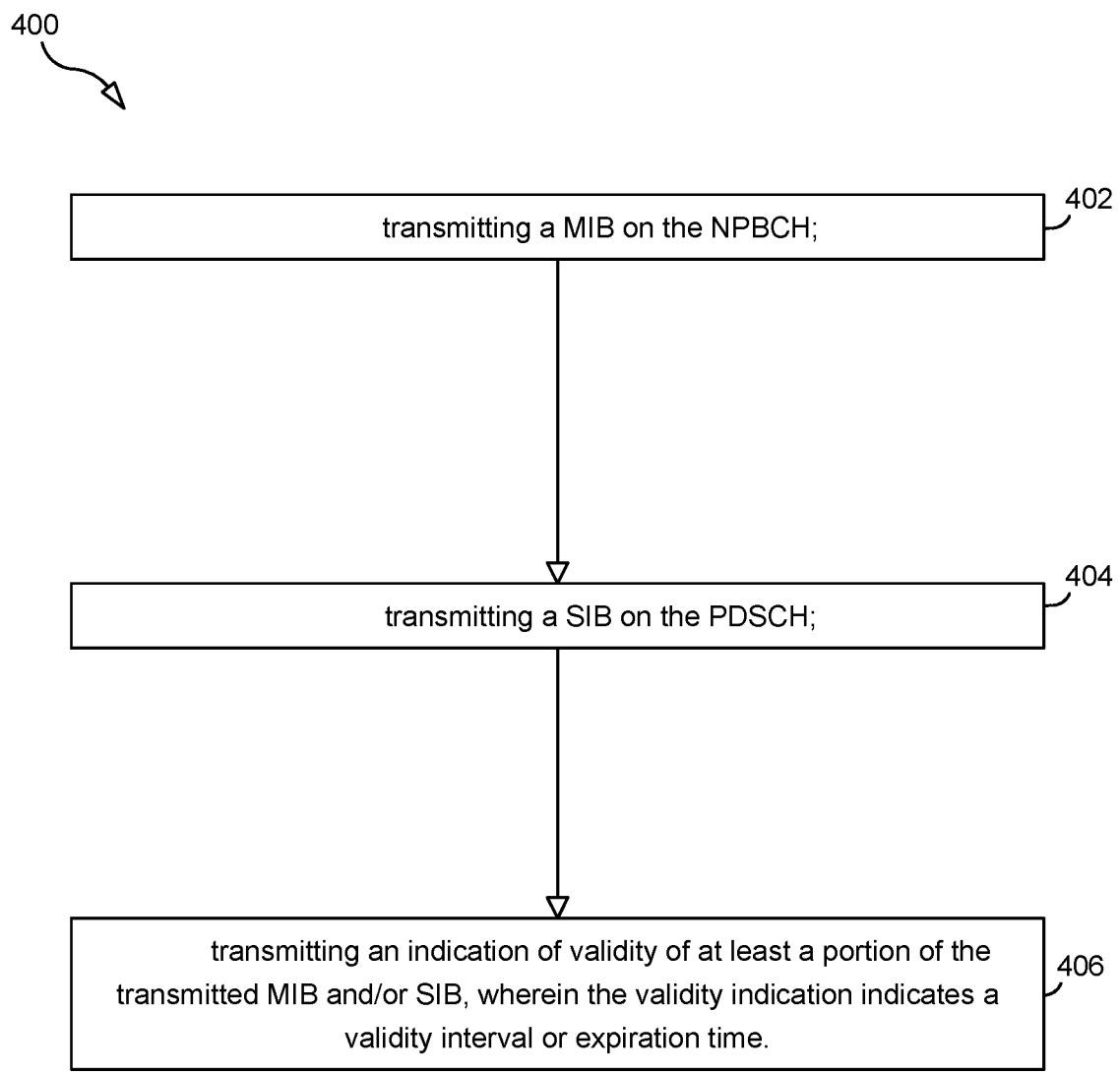
FIG. 4 is a flow chart illustrating a process according to some embodiments.

FIG. 4 illustrates a method 400, which may be implemented on network node 104. Network node 104 transmits a MIB on the NPBCH (step 402). Network node 104 transmits a SIB on the PDSCH (step 404). Network node 104 transmits an indication of validity of at least a portion of the transmitted MIB and/or SIB. The validity indication indicates a validity interval or expiration time. In some embodiments, the validity indication is in GPS or UTC time format. In some embodiments, the validity indication is quantized with a resolution equivalent to a multiple of System Frame Number (SFN) cycles.

Skipping SIB1-BR Acquisition:

For LTE-M the system value tag is, unlike for NB-IoT, located in SIB1-BR. A UE waking up from eDRX or PSM would therefore have to read SIB1-BR in order to find out whether SI has been updated and if it must reacquire the SI (either full information or the SIB s as indicated by the SI-message specific valueTags in systemInfoValueTagList). Further the UE may have to check whether it is subject to access barring or not. In LTE-M, UEs must not be barred according to both the ACB information in SIB2 and the enhanced access class barring (EAB) information in SIB14 in order to access. Typically SIB14 is only scheduled and broadcast when EAB is enabled so if it is not according to scheduling info in SIB1-BR the UE can interpret this as access is allowed according to EAB. In most cases, SI has not been updated and the UE is not barred, however the UE must still check to ensure this is the case. In Release 13 operation, this means that the UE has to read SIB1-BR and SIB2. Spare bits in the MIB could be used, however, to signal to the UE that the UE may skip acquiring SIB1-BR.

As described above, it is highly unlikely that 3GPP will agree to use all the 5 MIB spare bits for all future of LTE for the systemInfoValueTag, which is already present in SIB1-BR. A solution for eMTC to skip reading SIB1-BR is therefore to have a short indication in the MIB (e.g., a one bit flag). This short indication in the MIB is referred to herein as "the MIB indication." Generally, a UE should only skip reading SIB1-BR during re-acquisition of SI since SIB1-BR is, in many cases, essential for access and hence required for initial access.

Because SIB1-BR (and the systemInfoValueTag therein) is rarely updated, it is advantageous to have a MIB indication (e.g., flag) that is set to 1 to indicate that SIB1-BR/systemInfoValueTag has been updated at some point during a certain period of time (e.g., during a current period of time or the period of time immediately preceding the current period), and set the MIB indication to 0 to indicate otherwise (i.e., UE may skip reading SIB1-BR when the MIB indication is set to 0, otherwise UE should not skip reading SIB1-BR). That is, if SIB1-BR has not been updated during the certain time period, which is most often the case, the MIB indication is set to '0' and the UE can skip reading the SIB1-BR and the systemInfoValueTag. If there is a subsequent SIB1-BR change during the time period the MIB indication remains set to '1' and is not toggled back to '0' (i.e. unlike a valueTag). The MIB indication may be reset to '0' at the time period boundaries (e.g., if there has been no change to the SIB1-BR within the last X units of time (i.e., the certain time period)). Note that since the system valueTag and the scheduling information of the SI-messages are located in SIB1-BR, SIB1-BR will be updated if any of the SI messages are updated.

In some embodiments, using the MIB indication, the UE is required to check the MIB indication once per the MIB indication time period (e.g., in the last BCCH modification period of the time period). That is, if the UE skips a time period, the SIB1-BR might have been updated during that period and this will then not be discovered by the UE. The MIB indication time period could for example be any of the following, without limitation:

1) BCCH modification period. The SIB1-BR period would then coincide with the modification period for SI (note that SI can be updated 32 times during this period as given by the system information valueTag, whereas the new SIB1-BR does not impose any restriction for the number of updates but is on the other hand only beneficial if there has been no update). This time reference would be common to all UEs.

2) The system information validity period or 3 h or 24 h. Since the UE is required to check the MIB once per predefined time period (e.g., at least once every 3 or 24 hours), if a 1 bit indication is used, this has the advantage that it is considerably longer than the BCCH modification period and hence the UE is required to do so much more infrequently.

3) A HSFN period. The time period is based on system frame number (SFN) and/or hyper system frame number (HSFN). The latter is more probable since a longer timer period is more effective. 10 bits is used for SFN, giving a SFN wrap-around after 10.24 seconds. 10 bits is used for HSFN giving 1025 SFN periods which equals ~2.9 hours. A likely embodiment is to use 2n SFN periods as the time period, where n is the HSFN. This time reference would be common to all UEs.

4) Based on GPS or UTC time as provided in SIB16. This time reference would be common to all UEs.

A UE in DRX or eDRX that is in coverage would rely on being notified in paging whenever there is an update of SI, i.e. by checking systemInfoModification or, if the eDRX cycle is longer than the BCCH modification period, the systemInfoModification-eDRX in the paging message. With solutions described herein, the UE could potentially instead check the MIB indication once per time period (since SIB1-BR contains the system valueTag, this is potentially less energy-consuming than attempting to find the systemInfoModification indication at least modificationPeriodCoeff times during the modification period (refer to section 5.2.1.3 in 3GPP TS 36.331 v 14.2.2)). Further, as explained in 3GPP TS 36.311, for UEs with eDRX longer than the BCCH modification period, UEs are required to read SIB1-BR before access: "When the RRC_IDLE UE is configured with a DRX cycle that is longer than the modification period, and at least one modification period boundary has passed since the UE last verified validity of stored system information, the UE verifies that stored system information remains valid by checking the systemInfoValueTag before establishing or resuming an RRC connection."

In case there has been no SI update, the UE applying the solutions described herein advantageously only needs to acquire MIB and check the MIB indication and skip acquisition of SIB1-BR.

For a UE in power-saving mode (PSM), the UE will reside in a power-saving state (sub-state to RRC_IDLE) and before "keep-alive" signaling/checking for downlink data through the periodic Tracking Area Update (TAU) or before uplink data transmission, the UE must ensure it has up-to-date SI. In Release 13 and 14 operation, the UE would check that it has already acquired the up-to-date SI by checking the valueTag (i.e. systemInfoValueTag) in SIB1-BR. With the solutions described herein, the UE could acquire only MIB to check the MIB indication and skip reading SIB1-BR if and only if the time since the last uplink data transmission or periodic-TAU does not surpass the MIB indication time period (e.g., 3 h or 24 h) and the MIB indication is set to a particular value, which could be 0 or 1. For example, if the time period chosen for the described solutions is the HSFN wrap-around of 2.9 h, the UE would not have to read SIB1-BR (assuming its content has not been updated of course) if it is configured with a periodic-TAU that is shorter than 2.9 h. Again, in the rare case that SI has been updated, then the UE will just continue to read SIB1-BR as in Release 13 operation.

Figure 5:
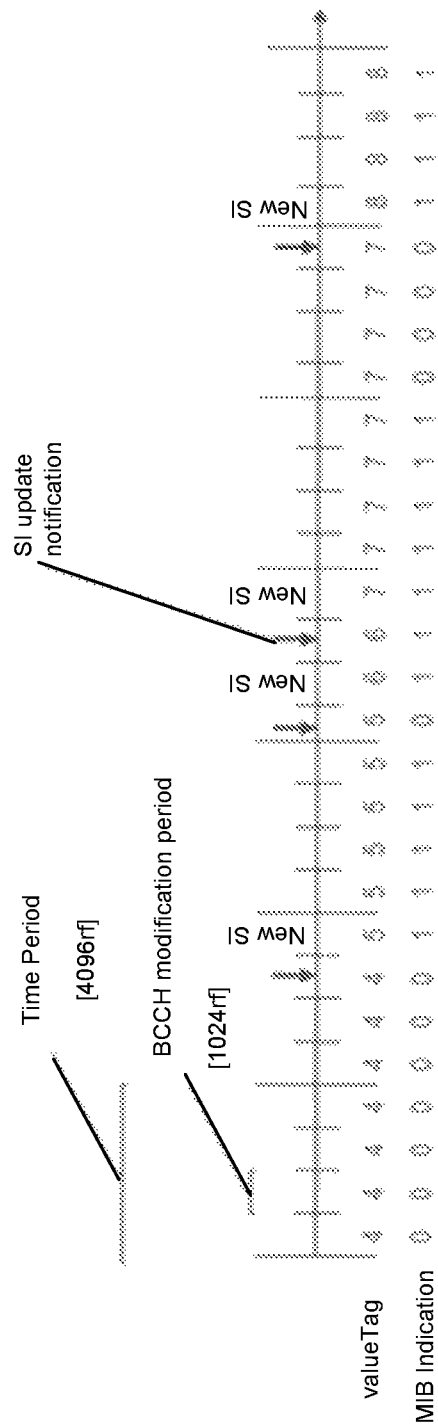
FIG. 5 illustrates an embodiment for SIB1-BR skipping.

An example of the functionality of the MIB indication is given in FIG. 5. In this case, the time period is based on HSFN using 2 HSFN bits, which makes it 4096 radio frames long. The BCCH modification period is here 1024 radio frames. As in Release 13 operation, the UEs are notified in paging when SI is to be updated, and the new SI will start to be broadcast in the subsequent BCCH modification period.

In general, the MIB indication would be set to a first particular value (e.g., 1) whenever UEs are required to read SIB1-BR, and set to a second particular value (e.g. 0) otherwise. There are alternative embodiments on how this could be done. In the embodiment shown in FIG. 5, the indication is set to 1 when the valueTag (i.e. systemInfoValueTag) is changed and remains set to 1 during the time periods after which SIB1-BR and SI has been updated. Alternatively, the MIB indication can be set to 1 even before the SI is updated, e.g. already in the preceding BCCH modification period in which UEs are notified in paging about the upcoming SI update (not shown in FIG. 5). In the above embodiment in which the MIB indication is set to 1 during the entire subsequent time period, it is sufficient that the UE checks the MIB indication once per time period and can do so at any time (i.e., if the SI is updated at the end of the time period after the UE has checked it still not go unnoticed since the UE will notice this the subsequent time period).

In one alternative embodiment, UEs could be required to check the MIB indication during the last BCCH modification period (and before access as always of course) in which case the MIB indication could always be reset to '0' at the time period boundaries. Thus, ensuring that the UE will still be notified about the SIB1-BR update if it is updated at the end of the time period. However, since SI is updated rarely, the benefit of this embodiment is likely negligible to the previous one and in general it may be better to have the MIB indication set to '1' for longer to avoid error cases (since setting it to '1' means that UEs will fall back to Release 13 operation). Therefore, in yet another embodiment the MIB indication could be set to '1' more extensively in time before and after a SI and SIB1-BR update. For example, the MIB indication could be set to '1' during the entire time period preceding the SI update, and/or set to '1' during the entire time period during the SI update, and/or set to '1' during the entire time period after the SI update.

The above embodiments use a 1 bit MIB indication, but additional embodiments using more bits is possible. For example, 2 bits could be used to indicate the following:

TABLE 2

| Indication in MIB: | Interpretation: |
|---|---|
| 00 | SIB1-BR has not been updated the last time period (e.g., the last 24 hours). |
| 01 | SIB1-BR has not been updated the last $N_1$ time periods. |
| 10 | SIB1-BR has not been updated the last $N_2$ time periods. |
| 11 | SIB1-BR has not been updated the last $N_3$ time periods. |

In one embodiment, the time period is the HSFN period. Further $N_i$ could be linear, e.g. $N_1=2$, $N_2=3$ and $N_3=4$. In an alternative embodiment, $N_i$ could be non-linear, e.g. logarithmic such that $N_1=2$, $N_2=4$ and $N_3=8$, or $N_1=10$, $N_2=100$ and $N_3=1000$. This would provide finer granularity of the information communicated to the UE (the UE would compare to when it last acquired SI) and it can be used to achieve gains beyond the HSFN period of 2.9 h. That is, if it is agreed to base the time period on SFN, UE would have to check the indication in MIB at least once every 2.9 h, but using multiple indication bits as above this could be extended such that UEs using PSM with very long periodic TAU (can be configured to be almost 14 days) could benefit from the solutions described herein, and would only need to acquire MIB at wake-up if there has been no SI update.

In some further embodiments, the time period itself associated with the 1 bit indication can be set/modified in a system information message. Similarly, the value of at least one of $N_1$, $N_2$ and $N_3$ in the example 2-bit indication embodiment above may be modified. Default values may be given by the standard, and these values will be used if a corresponding modified value is not provided as a part of the broadcasted system information. This increases the flexibility in the network to adapt to different deployment scenarios, configurations of eDRX and PSM, etc.

Note that the MIB indication is a systemInfoValueTag-indication in the sense that if any of the content of SIB1-BR is changed systemInfoValueTag is updated. However, in yet another embodiment the UE could still skip acquiring SIB1-BR although systemInfoValueTag has been updated. That is, a first bit is, as above, used to specify if the UE needs to acquire SIB1-BR or can skip it, whereas the additional bits specify what has changed in SIB1-BR.

The additional bits could for example indicate: (1) whether the update is related to other SI than SI required for monitoring paging (UEs in eDRX waking up to check paging could then still skip SIB1-BR acquisition); (2) whether the update is related to other SI than SI required for access (UEs attempting random access and RRC Connection Setup etc. could then still skip SIB1-BR acquisition); (3) any specified (group of) SIBs. And if the UE does not require any of that it can still omit reading SIB1-BR.

Figure 6:
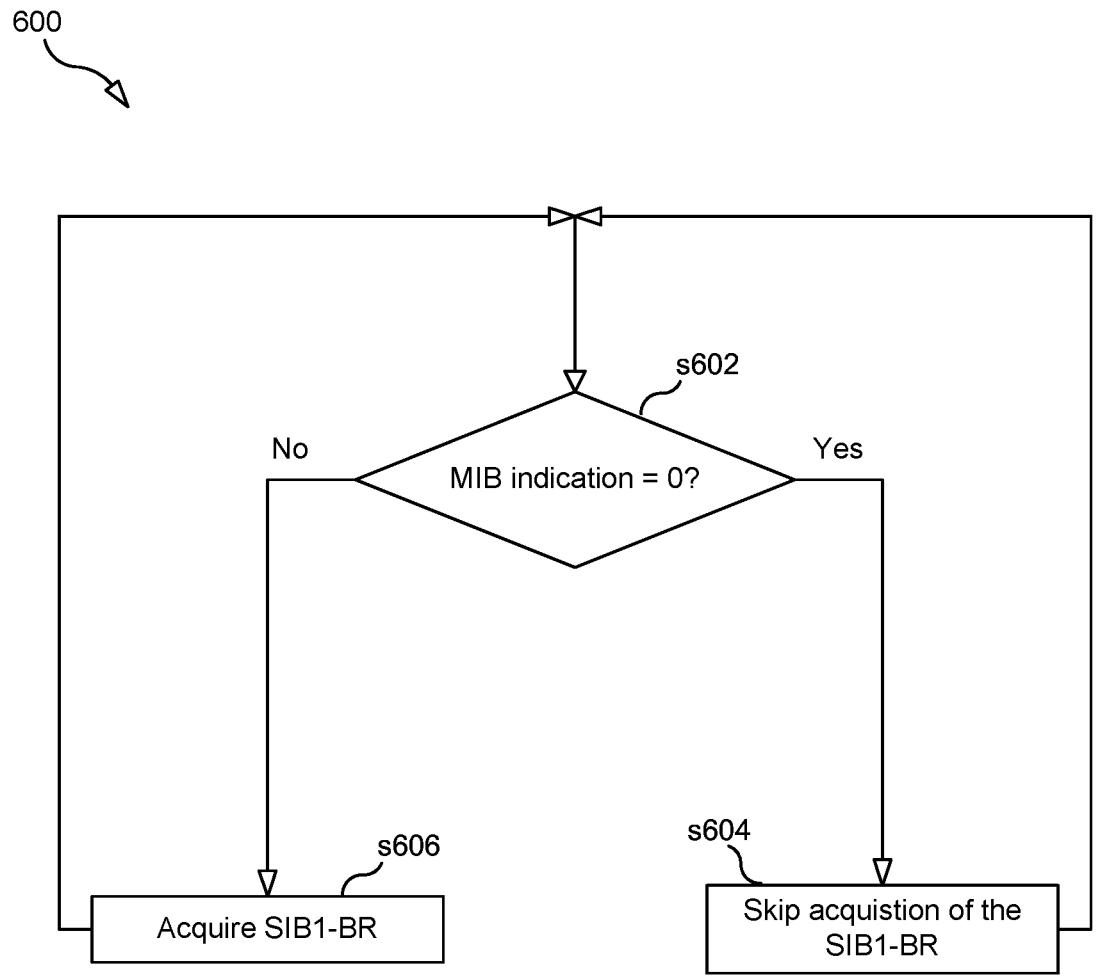
FIG. 6 is a flow chart illustrating a process according to some embodiments.

An example process 600 for UE operation is shown in FIG. 6. The process 600 begins when the UE determines whether the MIB indication is set to a particular value (e.g. 0 or 1) (step s602). This MIB indication may be a 1 bit MIB indication, but may also include additional bits, as described in more detail above. If the UE determines that the MIB indication is set to the particular value (e.g., 0), the UE can skip acquiring the SIB1-BR (step s604). However, if the UE determines that the MIB indication is not set to the particular value (e.g., is set to 1), then the UE will acquire the SIB1-BR (step s606).

Figure 7:
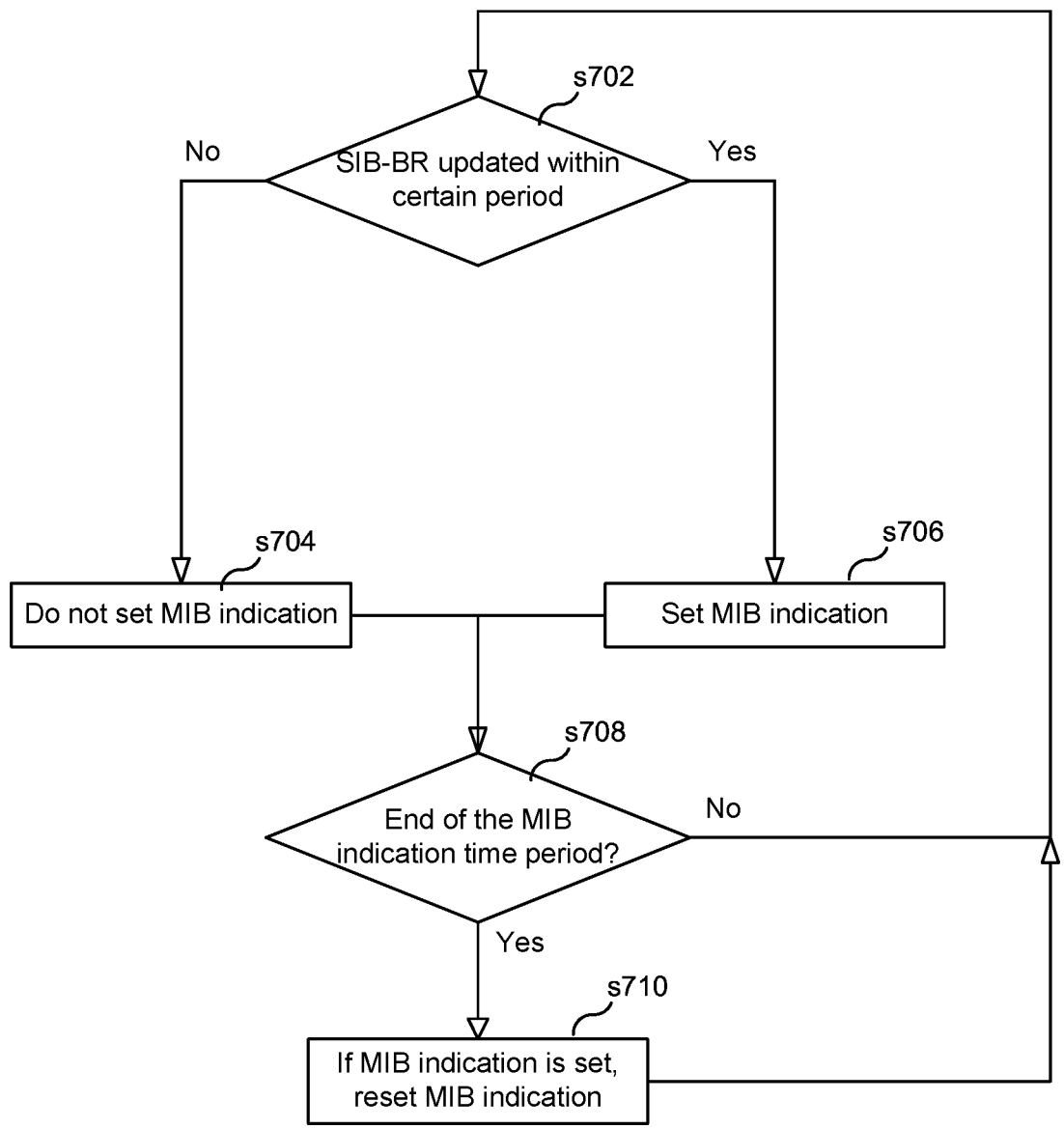
FIG. 7 is a flow chart illustrating a process according to some embodiments.

An example process 700 for network node (e.g., eNB) operation is shown in FIG. 7. The example process 700 begins when the network node determines whether a SIB1-BR update occurred during the previous or current time period (step s702). If no, no MIB indication is set (step s704). If yes, the network node sets a MIB indication (step s706). In the case of a 1 bit MIB indication "set MIB indication" would correspond to e.g. setting it to value '1' and that it is not set would correspond to value '0'. Note also that the logic of when it should be set to '1' by the eNB will depend on the embodiments as discussed above. After these steps, the network node determines whether a MIB indication time period has ended (step s708). If no, the network node repeats the previous steps, determining whether a SIB1-BR update has occurred. If the MIB indication time period has ended, the MIB indication may be reset by the network node (step s710). According to certain embodiments, this resetting may depend on other factors, including past and/or upcoming SIB1-BR updates.

The standard impact of the proposed solutions would be procedure text for the UE and updated MIB content, for which an example is shown below (changes in bold font):

TABLE 3

| MasterInformationBlock |
|---|
| -- ASN1START |
| MasterInformationBlock ::=    SEQUENCE { |
|   dl-Bandwidth                     ENUMERATED { |
|     n6, n15, n25, n50, n75, n100}, |
|   phich-Config                      PHICH-Config, |
|   systemFrameNumber         BIT STRING (SIZE (8)), |
|   schedulingInfoSIB1-BR-r13 INTEGER (0..31), |
|   SIB1-indication                BOOLEAN, |
|   spare                                    BIT STRING (SIZE (4)) |
| } |
| -- ASN1STOP |

The solutions proposed herein are described for eMTC but would be generally applicable also to other systems such as LTE or NR (but not needed for NB-IoT since there the system valueTag is located directly in MIB-NB).

In another embodiment, the MIB one bit flag could be used with the following meaning:

Bit set to '0'=SI has not been updated since the last BCCH modification period boundary and access barring (ACB or EAB) is currently not enabled in the cell.

Bit set to '1'=SI has been updated since the last BCCH modification period boundary or access barring (ACB or EAB) is currently enabled in the cell.

Note that this is not a valueTag and if the SI changes a second time to bit is not toggled back to value '0'. In an alternative embodiment the time period for the SI update is different from the BCCH modification period, e.g. multiple BCCH modification periods, the SIB1-BR modification period, or the SI validity time of 3 h/24 h.

In alternative embodiments multiple bits could be used to indicate more options, e.g. according to the following:

| Index: | Indication: |
|---|---|
| 00 | No SI updated and Access barring not enabled. |
| 01 | SI updated but Access barring not enabled. |
| 10 | No SI updated but Access barring enabled. |
| 11 | Both SI updated and Access barring enabled. |

Alternatively, either SI update or Access Barring could be omitted, or they could be indicated by separate bits.

Alternatively, this indication could be added to the Wake-up and go-to-sleep signal as described above.

According to the above, in one aspect there is provided a method, performed by a network node (e.g., network node 104), for reducing SI acquisition time. In one embodiment, the method includes the following steps: (1) generating a MIB comprising a one bit flag for indicating whether or not certain SI (e.g., valueTag) has changed since a particular time in the past (e.g., 24 hours ago, 3 hours ago, etc.) and (2) transmitting the MIB. In some embodiments, the particular time in the past is based on the current time and a MIB indication time period (e.g., 3 or 24 hours). In some embodiments, the particular time in the past is the current time minus the MIB indication time period. In other embodiments, the particular time in the past is a certain absolute time period boundary.

In some embodiments, the method also includes the network node performing the following steps: updating the certain SI; setting an SI change flag to a first value to indicate that the certain SI has changed; activating a timer that will expire when the MIB indication time period (e.g., 24 hours) has elapsed since the timer was activated; if the timer expires, setting the SI change flag to a second value to indicate that the certain SI has not changed within the MIB indication time period (e.g., within the past 24 hours); and if the certain SI is further updated while the timer is still running, resetting the timer so that timer will expire when the MIB indication time period has elapsed since the timer was reset. In this embodiment, the one bit flag included in the MIB is set equal to the value of the SI change flag.

In another aspect there is provided a method, performed by UE 102, for reducing SI acquisition time. In one embodiment, the method includes the UE receiving a MIB comprising a one bit flag for indicating whether or not certain SI has been changed since a particular time in the past. The method may further include the UE, after receiving the MIB, acquiring a SIB that comprises the certain SI (e.g., acquire SIB1-BR), wherein the UE acquires the SIB regardless of the value to which the flag is set. For instance, the UE may acquire the SIB regardless of the setting of the flag after the UE wakes from a sleep and the last time the UE has acquired the particular SIB was more than X hours ago (e.g., X=3 or 24).

The method may further include the UE, after acquiring the SIB, receiving a subsequent MIB comprising the MIB indication that is set to a value that indicates that the certain SI has not been changed since a particular point in time in the past (e.g., indicating that the SI has not changed in the last X hrs); the UE determining whether acquisition of a subsequent SIB may be skipped, wherein the determining comprises the UE determining that the flag is set to the particular value; and after determining that acquisition of the subsequent SIB may be skipped, the UE skipping the acquisition of a subsequent SIB that comprises the certain SI. In some embodiments, the particular time in the past is based on a current time and a MIB indication time period. In some embodiments, the step of determining whether acquisition of the subsequent SIB may be skipped further includes the UE determining whether it currently has up-to-date SI. In some embodiments, the UE determines that it has up-to-date SI by determining that it last acquired the SI within the MIB indication time period.

Figure 8:
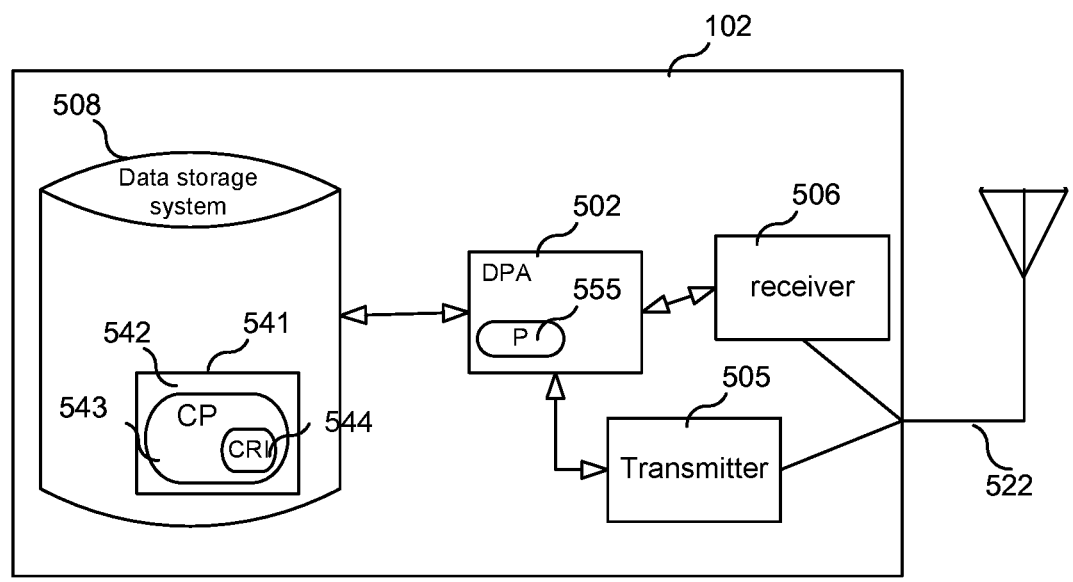
FIG. 8 is a block diagram of a UE according to some embodiments.

FIG. 8 is a block diagram of UE 102 according to some embodiments. As shown in FIG. 8, UE 102 may comprise: a data processing apparatus (DPA) 802, which may include one or more processors (P) 855 (e.g., a general purpose microprocessor and/or one or more other processors, such as an application specific integrated circuit (ASIC), field-programmable gate arrays (FPGAs), and the like); a transmitter 805 and a receiver 804 coupled to an antenna 822 for enabling UE 102 to transmit data to and receive data from an AN node (e.g., base station); and local storage unit (a.k.a., "data storage system") 808, which may include one or more non-volatile storage devices and/or one or more volatile storage devices (e.g., random access memory (RAM)). In embodiments where UE 102 includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media, memory devices (e.g., random access memory), and the like. In some embodiments, the CRI 844 of computer program 843 is configured such that when executed by data processing apparatus 802, the CRI causes UE 102 to perform steps described above (e.g., steps described above with reference to the flow charts). In other embodiments, UE 102 may be configured to perform steps described herein without the need for code. That is, for example, data processing apparatus 802 may consist merely of one or more ASICs. Hence, the features of the embodiments described herein may be implemented in hardware and/or software.

Figure 9:
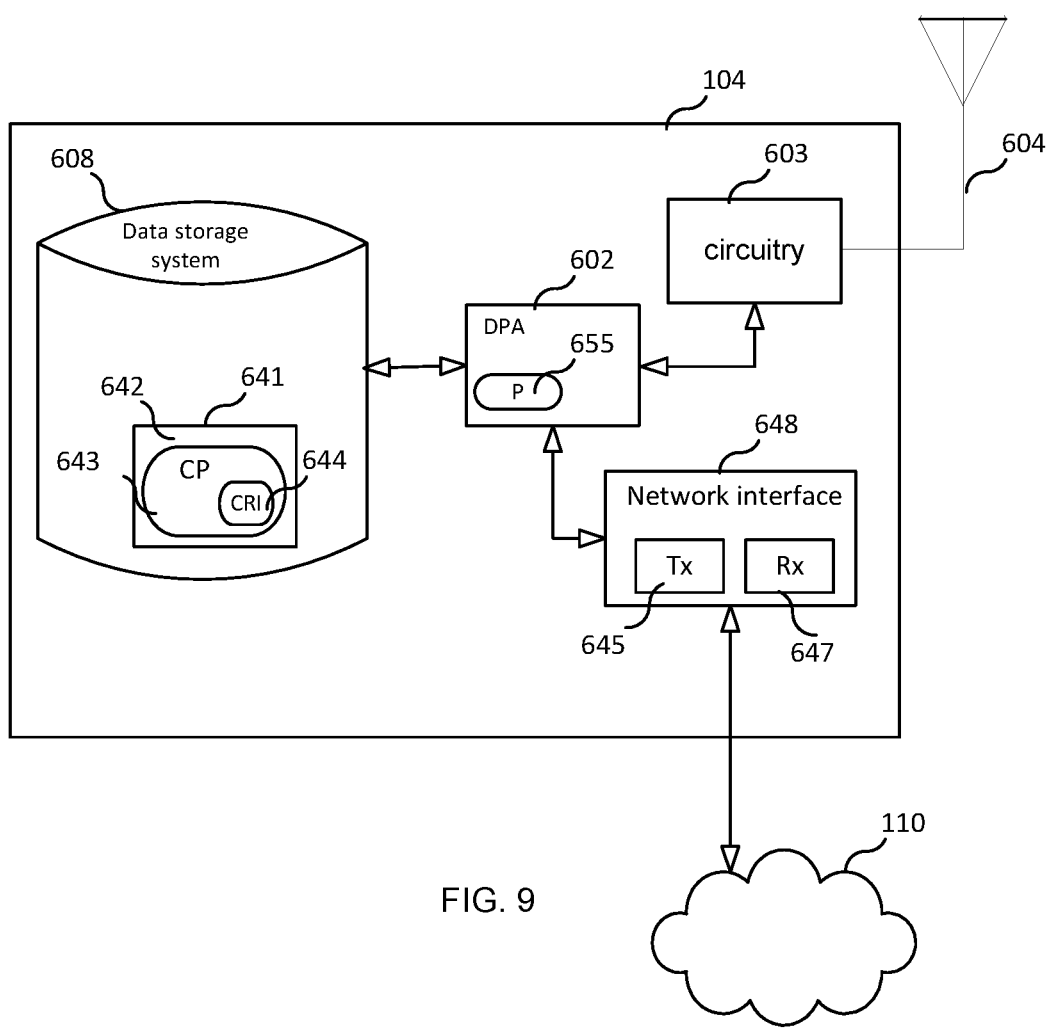
FIG. 9 is a block diagram of a network node according to some embodiments.

FIG. 9 is a block diagram of a network node 104 according to some embodiments. As shown in FIG. 9, node 104 may comprise: a data processing apparatus (DPA) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling node 104 to transmit data to and receive data from other nodes connected to a network 110 (e.g., an Internet Protocol (IP) network) to which network interface 948 is connected; circuitry 903 (e.g., radio transceiver circuitry) coupled to an antenna system 904 for wireless communication with UEs); and local storage unit (a.k.a., "data storage system") 908, which may include one or more non-volatile storage devices and/or one or more volatile storage devices (e.g., random access memory (RAM)). In embodiments where node 104 includes a general purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory), and the like. In some embodiments, the CRI 944 of computer program 943 is configured such that when executed by data processing apparatus 902, the CRI causes node 104 to perform steps described above (e.g., steps described above with reference to the flow charts). In other embodiments, node 104 may be configured to perform steps described herein without the need for code. That is, for example, data processing apparatus 902 may consist merely of one or more ASICs. Hence, the features of the embodiments described herein may be implemented in hardware and/or software.

Additional Embodiments

A1. A method performed by a user equipment (UE), comprising: receiving a master information block (MIB)

and/or a system information block (SIB); receiving an indication of validity of at least a portion of the received MIB and/or SIB, wherein said MIB is carried in a Narrowband Physical Broadcast Channel (NPBCH), wherein said SIB is carried in a Narrowband Physical Downlink Shared Channel (PDSCH), and wherein said indication indicates a validity interval or expiration time.

A2. The method of embodiment A1, wherein the indication is in GPS or UTC time format.

A3. The method of any of embodiments A1-A2, wherein the indication is quantized with a resolution equivalent to a multiple of System Frame Number (SFN) cycles.

A4. The method of any of embodiments A1-A3, further comprising receiving an update notification.

A5. The method of any one of embodiments A1-A4, wherein receiving the indication comprising receiving a system information block (SIB) comprising the indication.

A6. The method of any one of embodiments A1-A5, further comprising: storing said at least a portion of the MIB; after storing said at least a portion of the MIB, entering a sleep state; after entering the sleep state, waking up from the sleep state; and as a result of waking up from the sleep state, determining, based on the validity indication, whether the stored portion of the MIB is still valid.

A7. The method of embodiment A6, further comprising: as a result of determining that the stored portion of the MIB is still valid, receiving a second MIB carried on the NPBCH and skipping decoding one or more portions of the received second MIB but decoding one or more other portions of the received second MIB.

A8. The method of claim A7, wherein the second MIB comprises encoded operating mode information indicating an operation mode and encoded access barring (AB) flag, the UE decodes the encoded AB flag, and the UE skips the decoding of the operating mode information.

B1. A method performed by a user equipment (UE), comprising: waking up from a sleep state; determining if a portion of a master information block (MIB) and/or system information block (SIB) needs to be reacquired; in response to determining that a portion of MIB and/or SIB information does not need to be reacquired, acquiring only the remaining portion of MIB and/or SIB information.

B2. The method of embodiment B1, wherein the remaining portion includes System Frame Number (SFN) and Access Barring (AB) flag information.

B3. The method of any of embodiments B1-B2, wherein acquiring only the remaining portion of MI and/or SI information includes decoding a Master Information Block (MIB) carried on the Narrowband Physical Broadcast Channel (NPBCH).

B4. The method of embodiment B3, wherein the decoding further includes using the portion of MI and/or SI that does not need to be reacquired to prune the trellis used in the Viterbi decoder.

B5. The method of any of embodiments B1-B2, wherein a "wake-up" signal and/or a "go-to-sleep" signal is used to indicate whether Downlink Control Information (DCI) will be sent.

C1. A user equipment, UE, wherein the UE is adapted to: receive a master information block (MIB) carried in a Narrowband Physical Broadcast Channel (NPBCH) and/or system information block (SIB) carried in a Narrowband Physical Downlink Shared Channel (PDSCH); and receive an indication of validity of at least a portion of the received MIB and/or SIB, wherein said indication indicates a validity interval or expiration time.

D1. A user equipment, UE, the UE comprising: a first receiving module configured to employ a receiver to receive at least one of: (1) master information block (MIB) carried in a Narrowband Physical Broadcast Channel (NPBCH) and/or system information (SIB) carried in a Narrowband Physical Downlink Shared Channel (PDSCH) and; a second receiving module configured to employ the receiver to receive an indication of validity of at least a portion of the received MIB and/or SIB, wherein said indication indicates a validity interval or expiration time.

E1. A user equipment, UE, the UE comprising: a receiver; a transmitter; a data storage system; and a data processing apparatus comprising a processor, wherein the data processing apparatus is coupled to the data storage system, the transmitter, and the receiver, and the data processing apparatus is configured to: employ the receiver to receive at least one of: (1) master information block (MIB) carried in a Narrowband Physical Broadcast Channel (NPBCH) and/or system information (SIB) carried in a Narrowband Physical Downlink Shared Channel (PDSCH) and; employ the receiver to receive an indication of validity of at least a portion of the received MIB and/or SIB, wherein said indication indicates a validity interval or expiration time.

F1. A user equipment, UE, wherein the UE is adapted to: wake up from a sleep state; determine if a portion of a master information block (MIB) and/or system information block (SIB) needs to be reacquired; and in response to determining that a portion of MIB and/or SIB information does not need to be reacquired, acquire only the remaining portion of MIB and/or SIB information.

G1. A user equipment, UE, the UE comprising: a waking module for waking up from a sleep state; a determining module for determining if a portion of a master information block (MIB) and/or system information block (SIB) needs to be reacquired; and a decoding module for decoding only the remaining portion of MIB and/or SIB information in response to determining that a portion of MIB and/or SIB information does not need to be reacquired.

H1. A user equipment, UE, the UE comprising: a receiver; a transmitter; a data storage system; and a data processing apparatus comprising a processor, wherein the data processing apparatus is coupled to the data storage system, the transmitter, and the receiver, and the data processing apparatus is configured to: wake up from a sleep state; determine if a portion of a master information block (MIB) and/or system information block (SIB) needs to be reacquired; and in response to determining that a portion of MIB and/or SIB information does not need to be reacquired, acquire only the remaining portion of MIB and/or SIB information.

I1. A method performed by a network node (e.g., base station), the method comprising: transmitting a MIB on the NPBCH; transmitting a SIB on the PDSCH; transmitting an indication of validity of at least a portion of the transmitted MIB and/or SIB, wherein the validity indication indicates a validity interval or expiration time.

I2. The method of embodiment I1, wherein the validity indication is in GPS or UTC time format.

I3. The method of any of embodiments I1-I2, wherein the validity indication is quantized with a resolution equivalent to a multiple of System Frame Number (SFN) cycles.

J1. A network node, wherein the network node is adapted to: transmit a MIB on the NPBCH; transmit a SIB on the PDSCH; transmit an indication of validity of at least a portion of the transmitted MIB and/or SIB, wherein the validity indication indicates a validity interval or expiration time.

K1. A network node, the network node comprising: a first transmitting module for employing a transmitter to transmit a MIB on the NPBCH; a second transmitting module for employing a transmitter to transmit a SIB on the PDSCH; a first transmitting module for employing a transmitter to transmit an indication of validity of at least a portion of the transmitted MIB and/or SIB, wherein the validity indication indicates a validity interval or expiration time.

L1. A network node, the network node comprising: a receiver; a transmitter; a data storage system; and a data processing apparatus comprising a processor, wherein the data processing apparatus is coupled to the data storage system, the transmitter, and the receiver, and the data processing apparatus is configured to: transmit a MIB on the NPBCH; transmit a SIB on the PDSCH; transmit an indication of validity of at least a portion of the transmitted MIB and/or SIB, wherein the validity indication indicates a validity interval or expiration time.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. For example, while many of the above embodiments are described using NB-IoT or LTE-M as examples, the embodiments are not limited to any particular technology or standard, and, thus, the embodiment may be applied to the other technology as well as to any other communications standard, such as e.g. NR. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

This application claims priority to provisional application No. 62/502,423, filed on May 5, 2017, which application includes an appendix containing the text of a 3GPP contribution. Certain portions of this contribution are reproduced below:

1. INTRODUCTION

In Rel-15, a work item (WI) for enhancement of NB-IoT is agreed. The objective is to further enhance the performance of NB-IoT by further reduction of latency and power consumption, improvement of measurement accuracy, enhancement of NPRACH reliability and range, reducing system acquisition time etc. [00206]. By reducing system acquisition time, latency and efficiency of NB-IoT can be further improved.

In RAN1#88bis meeting, regarding system acquisition time reduction, it was agreed that at least the following candidates can be considered.

Enhancement(s) to NPSS/NSSS
Enhancement(s) to MIB-NB
SIB1-NB accumulation across multiple SIB1-NB TTIs (with or without specification impact)
New mechanism allowing to skip SIB1-NB and/or SI messages and/or MIB-NB reading
Additional SIB1-NB is transmitted on other subframes in addition to the existing SIB1-NB transmission
Use of physical signal/channel in agenda item 7.2.7.1.1 (if introduced). Note: This is the wake-up or go-to-sleep signal being considered.
FFS on other SIBx-NB
Details of all solutions are FFS
Solutions need to be backwards compatible and take care of impacts to Rel-13/Rel-14 networks:

2. GENERAL DISCUSSION

Among the three NB-IoT deployment modes, the in-band deployment requires longer system acquisition time due to lower transmit power level and puncturing that may occur on NPSS and NSSS resources. Additionally, in the in-band mode, NPDSCH that carries SIB1-NB or SI messages has fewer resource elements in a subframe due to resources taken by LTE CRS or reserved for LTE downlink control region, compared to the standalone and guard-band modes. This results in a higher coding rate and thus a lower coding gain. Thus, improvement for system acquisition time reduction should primarily target the in-band mode. The solutions can reduce the system acquisition time for the in-band mode can be directly applied to the guard-band and standalone modes.

Observation 1: Improvement for system acquisition time reduction should primarily target the in-band mode. The solutions can reduce the system acquisition time for the in-band mode can be directly applied to the guard-band and standalone modes.

The process of system acquisition after the UE wakes up from deep sleep includes the following steps: (1) Synchronize to NPSS; (2) Synchronize to NSSS; (3) Acquire MIB-NB through receiving NPBCH. The UE can check the system information (SI) value tag and access barring (AB) flag in MIB-NB. If the SI value tag hasn't changed and AB flag is not enabled, the UE has completed the system acquisition process.

Since MIB-NB and SI are rarely changed (except for SIB-14 and SIB-16), and although the AB flag can toggle more dynamically it is set false much more often than set true, in most cases the UE only needs to go through these three steps in most cases after it wakes up from deep sleep. One possible remaining uncertainty is the hyper-SFN (H-SFN) number. Although MIB-NB contains the two LSBs of H-SFN, a complete H-SFN is acquired only when SIB1-NB is acquired. Consider the frequency error of 20 ppm when the UE is in deep sleep, it will take 50,000 SFN cycles in sleep for the UE clock to drift by one SFN cycle (i.e. 1024 SFNs or 1 H-SFN), or equivalently 200,000 SFN cycles in sleep for the UE clock to drift by 4 SFN cycles (i.e. 4 H-SFNs). If the drift is more than 4 SFN cycles, the UE needs to acquire more than the two LSBs of H-SFN and therefore needs to acquire SIB1-NB. However, 200,000 SFN cycles is approximately 23.7 days. If latency is important for any of the use cases that the UE supports, to avoid needing to acquire SIB1-NB only for the sake of resolving timing uncertainty, the UE should be configured for PSM with TAU interval set for less than 23.7 days. Thus, the focus of Rel-15 should be on improving the acquisition of NPSS, NSSS, and NPBCH. Among these three steps, acquisition of NSSS is the easiest. Between NPSS and NPBCH, NPBCH is relatively more straightforward and has less impact on UE complexity and backward compatibility. We propose that Rel-15 should first focus on improving NPBCH performance.

Proposal 1: Rel-15 should first focus on improving NPBCH performance.

For in-band deployment, the total overhead on a Rel-13 NB-IoT anchor carrier can be very high, as illustrated in the example in Table 4. As seen, the percentage of resource elements available for NPDCCH/NPDSCH symbols, excluding those carrying SIB1-NB, may be as small as 42% in the worst-case scenario (in-band, 3 OFDM symbols for LTE PDCCH, and 4 CRS ports). Using more NPBCH repetitions will further reduce the percentage of resource elements available for NPDCCH/NPDSCH.

TABLE 4

Overheads and percentage of resource elements available to NPDSCH/NPDCCH on a Rel-13 anchor carrier. (in-band, 3 OFDM symbols for LTE PDCCH, and 4 CRS ports)

| | |
|---|---|
| overhead due to LTE | 31.0% |
| overhead due to NPBCH | 6.0% |
| overhead due to NPSS | 6.9% |
| overhead due to NSSS | 3.5% |
| overhead due to NRS | 8.1% |
| SIB1-NB | 3.0% |
| total overhead | 58.3% |
| percentage of resource elements available to NPDSCH/NPDCCH | 41.7% |

Observation 2: On a Rel-13 NB-IoT anchor carrier, the percentage of resource elements available for NPDCCH/NPDSCH symbols, excluding those carrying SIB1-NB, is only 42% in the worst-case scenario (in-band, 3 OFDM symbols for LTE PDCCH, and 4 CRS ports). Using more NPBCH repetitions will further reduce the percentage of resource elements available for NPDCCH/NPDSCH.

In the remainder of this document, we focus on solutions for reducing NPBCH acquisition time that (1) do not incur significant additional overheads on a NB-IoT anchor carrier (2) beneficial for the in-band mode. The solutions considered include (1) more sophisticated receivers and (2) New mechanism allowing to skip MIB-NB and SIB1-NB reading.

3. MORE SOPHISTICATED RECEIVERS

In [2], cross-subframe channel estimation and advanced MIB-NB decoding technique were considered. While cross-subframe channel estimation and its benefits are well understood, advanced MIB-NB decoding technique [3] may require further discussion. In this section, we discuss an advanced MIB-NB decoding technique that allows the UE to jointly decode NPBCH received signals over multiple 640-ms NPBCH TTIs.

Figure 10:
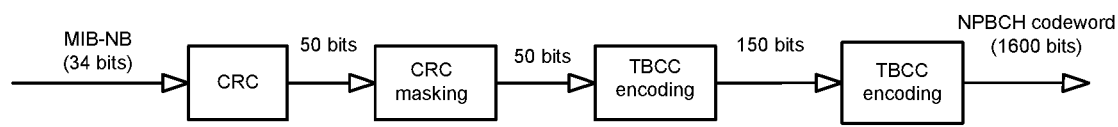
FIG. 10 illustrates an encoding process according to some embodiments.

The encoding process of MIB-NB is illustrated in FIG. 10. MIB-NB is 34-bit long, and the first 6 bits consist of the 4 MSBs of SFN and 2 LSBs of H-SFN. The CRC encoder adds 16 CRC bits, which are later applied with a mask that is dependent of the number of antenna ports used to transmit NPBCH. After CRC encoding and masking, the 50-bit sequence is encoded with TBCC to produce a codeword of 150 bits, which based on the LTE rate matching algorithm generate a 1600-bit NPBCH codeword. On the receiver side, the UE can first undo rate matching, and thus the core problem is use a TBCC decoder to process the 150 bit soft values and produce a decoded bit sequence.

An important code property to exploit is that both the CRC and TBCC codes are linear codes. Recall that if $x_1$ and $x_2$ are two information vectors over GF(2) and C is a linear code so that $C(x_1)=w_1$, then $C(x_1+x_2)=w_1+w_2$. Exploiting such a linear code property, joint decoding over multiple NPBCH TTIs can be easily done assuming that the MIB-NB information content that changes across TTIs is the 6 bits SFN and H-SFN information. We illustrate how this works below.

Figure 11:
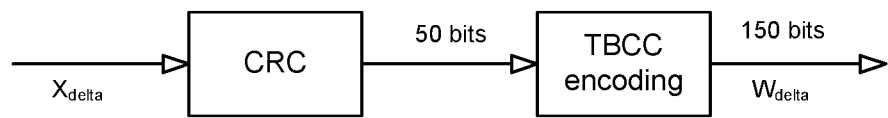
FIG. 11 illustrates an encoding process according to some embodiments.

Assume the 6 bits SFN and H-SFN information in the first TTI is $(s_6, s_7, s_8, s_9, h_0, h_1)=(0,0,0,0,0,0)$, and therefore in the subsequent TTI it is (1,0,0,0,0,0). Here we use $(s_6, s_7, s_8, s_9)$ and $(h_0, h_1)$ to represent the 4 MSBs of SFN and 2 LSBs of H-SFN, respectively. The difference between the two MIB-NB information vectors (34 bits each) in two consecutive TTI's is $x_A=(1, 0, 0, \ldots 0)$. Using the linear code properties, the difference in the TBCC codewords, denoted as $w_A$ can be computed using the process illustrated in FIG. 11. Note here that compared to FIG. 10, CRC masking is not needed as it disappears after taking the difference between two codewords. $w_A$ can be thought of as an additional scrambling mask applied to the codeword in the 2nd TTI, relative to the codeword in the first TTI. Thus, to use the two received codewords for joint decoding, the receiver can descramble the second received codeword using $w_A$ and soft combine with the first codeword. Note that such a technique can be extended to using more than two TTI's for joint decoding at the expense of increase soft buffer requirements.

For MIB-NB, the six frame counter bits $(s_6, s_7, s_8, s_9, h_0, h_1)$ have 64 combinations, but only result in six different $x_A$ vectors, and therefore six different $w_A$ vectors. This is illustrated in Table 5. In Table 5, we highlight the first time a new $x_A$ vector appears in blue. As seen, many frame counter values share the same $x_A$ vector.

The six different $w_A$ vectors requires that the received codewords over two TTIs are combined in 6 different ways. Thus, the decoder memory is increased from 150 bit soft values to 900 bit soft values when combining across two TTIs. The decoder complexity however is the same as a regular TBCC decoder in that the number of trellis state remains as 64 and each state has two outbound branches and two inbound branches. The only twist is that the branch metric calculation needs to base on an appropriately chosen version of combined received codeword. For a particular state, the process of determining which version of combined received codeword to use is however deterministic and does not involve additional hypotheses.

TABLE 5

Relationship between frame counter value and $x_A$. Although there are 64 possible frame counter values, there are only 6 possible $x_A$ vectors.

| $(s_6, s_7, s_8, s_9, h_0, h_1)$ in first TTI | $(s_6, s_7, s_8, s_9, h_0, h_1)$ in second TTI | $x_A$ (length 34 vector) |
|---|---|---|
| (0, 0, 0, 0, 0, 0) | (1, 0, 0, 0, 0, 0) | (1, 0, . . . , 0) |
| (1, 0, 0, 0, 0, 0) | (0, 1, 0, 0, 0, 0) | (1, 1, 0, . . . , 0) |
| (0, 1, 0, 0, 0, 0) | (1, 1, 0, 0, 0, 0) | (1, 0, . . . , 0) |
| (1, 1, 0, 0, 0, 0) | (0, 0, 1, 0, 0, 0) | (1, 1, 1, 0, . . . , 0) |
| (0, 0, 1, 0, 0, 0) | (1, 0, 1, 0, 0, 0) | (1, 0, 0, . . . , 0) |
| (1, 0, 1, 0, 0, 0) | (0, 1, 1, 0, 0, 0) | (1, 1, 0, . . . , 0) |
| (0, 1, 1, 0, 0, 0) | (1, 1, 1, 0, 0, 0) | (1, 0, . . . , 0) |
| (1, 1, 1, 0, 0, 0) | (0, 0, 0, 1, 0, 0) | (1, 1, 1, 1, 0, . . . , 0) |
| . . . | . . . | . . . |
| (1, 1, 1, 1, 0, 0) | (0, 0, 0, 0, 1, 0) | (1, 1, 1, 1, 1, 0, . . . , 0) |
| . . . | . . . | . . . |
| (1, 1, 1, 1, 1, 0) | (0, 0, 0, 0, 0, 1) | (1, 1, 1, 1, 1, 1, . . . , 0) |

Observation 3: Exploiting the linear code properties of CRC and TBCC, joint decoding across multiple NPBCH TTI's can be done by simply applying an appropriate descrambling mask to the bit soft values before combining the TBCC codewords across multiple TTIs.

Using more sophisticated NPBCH receivers is the most attractive solution as it does not require additional signaling and thus not giving rise to any additional signaling overheads.

4. NEW MECHANISM ALLOWING TO SKIP MIB-NB AND SIB1-NB READING

Since MIB-NB and SI rarely change (except for SIB14-NB and SIB16), one way to allow the UE to skip reacquiring MIB-NB and SI that will remain unchanged is to have eNB indicate a validity interval or the expiration time of MIB-NB and SI information. In the below discussion we will assume that changes of the AB flag, SIB14-NB, SIB16, SFN and H-SFN are not used to determine the MI/SI validity interval or expiration time. With such indication, if the UE wakes up within the MI/SI validity interval of the version that it has acquired previously, there is no need to reacquire the same information. In such scenarios, the UE only needs to acquire AB flag, SFN and H-SFN. To support this method, there are two issues that need to be addressed: 1) How does the network signal the MI/SI validity interval or expiration time? and 2) How does the UE acquire AB flag, SFN and H-SFN without acquiring the full MIB-NB and SIB1-NB?

4.1 Signal the MI/SI Validity Interval or Expiration Time

There are possibly many methods that can be used to signal the MI/SI validity interval or expiration time. Here are some possible solutions.

4.1.1 A new system information type can be defined to indicate MI/SI validity interval or expiration time. One possible format is to use GPS time or Coordinated Universal Time (UTC). A UE can acquire GPS and UTC time from SIB16 to establish its real-time clock. A new SIB-X can then be used to indicate the GPS or UTC time that the current MI/SI will expire. The format of SIB-X can be similar to the UTC format used in SIB-16. However, in SIB16 the time resolution is 10 ms. For SIB-X, much coarse time resolution can be used to reduce the number of bits needed to represent the UTC time. One possibility is to quantize the UTC time with a resolution equivalent to one or multiple SFN cycles. Also, the UTC time information in SIB16 includes year and month information. For SIB-X, it may not be necessary to include year and month information.

4.1.2 A UE can be notified of an update of SIB-X via SI update notification. Such an update notification may be specific to SIB-X.

Proposal 2: eNB signaling the MI/SI validity interval or expiration time is considered. The MI/SI validity or expiration time is not affected by changes of the AB flag, SFN and H-SFN. The exact signaling method is FFS.

4.2 UE Acquire AB Flag, SFN and H-SFN

System acquisition time reduction needs to allow certain configurations to support use cases that requires long battery lifetime (e.g. 10-15 years) and 10 s latency for Exception report [4]. However, it is not necessary for a solution to cater for use cases that only transmit data less frequently than, e.g., once every three days. For use cases with very infrequent data transmissions, 15 years battery lifetime can already be achieved without further system acquisition time reduction. Consider 20 ppm oscillator accuracy, the UE clock may be off by approximately ±5120 ms in 3 days. Thus, if the UE comes back to the network after 3 days, it needs to resolve this time ambiguity. This uncertainly window matches the duration of one SFN cycle, and thus it takes 10 bits SFN representation to resolve the time ambiguity. The UE will go through the steps of NPSS and NSSS synchronization, and after these two steps it achieves synchronization to 80-ms framing in the system frame structure, i.e. it acquires the 3 LSBs of SFN. Thus, if the UE skips reading MIB-NB, it needs to get the 7 MSBs bits of SFN to resolve the time ambiguity. Adding the AB flag, overall an 8-bit information needs to be provided to the UE.

There are two alternatives of how a UE can acquire such information, which are described below.

4.2.1 Using NPBCH

The SFN and AB flag are provided in NPBCH. The UE can treat all the other information elements as known and only focus on decoding SFN and AB flag. The known information bits can be used to prune the trellis and it is expected that the performance can be significantly improved with trellis pruning. In fact, the UE may also check the SI value tag if the MI/SI validity interval or expiration time information as discussed in Section 4.1 is not provided. With a more sophisticate NPBCH decoder that takes advantage of the known MIB-NB bits, the UE can decode the information elements it needs (e.g. SFN and AB flag) with fewer repetitions. This helps reduce system acquisition time.

4.2.2 Using Wake-Up or go-to-Sleep Signal

Wake-up and go-to-sleep signal is being discussed as a potential solution for achieving power consumption reduction. The required timing information and AB flag can be bundled with the wake-up or go-to-sleep signal. If the MI/SI validity interval or expiration time information as discussed in Section 4.1 is not provided, the SI value tag may also be bundled. This approach however works for UEs who are monitoring the wake-up or go-to-sleep signal.

5. CONCLUSIONS

In this document, we discuss potential solutions that can reduce system acquisition time. Based on the discussions presented in this document, the below observations and proposals are made.

Observation 1: Improvement for system acquisition time reduction should primarily target the in-band mode. The solutions can reduce the system acquisition time for the in-band mode can be directly applied to the guard-band and standalone modes.

Proposal 1: Rel-15 should first focus on improving NPBCH performance.

Observation 2: On a Rel-13 NB-IoT anchor carrier, the percentage of resource elements available for NPDCCH/NPDSCH symbols, excluding those carrying SIB1-NB, is only 42% in the worst-case scenario (in-band, 3 OFDM symbols for LTE PDCCH, and 4 CRS ports). Using more NPBCH repetitions will further reduce the percentage of resource elements available for NPDCCH/NPDSCH.

Observation 3: Exploiting the linear code properties of CRC and TBCC, joint decoding across multiple NPBCH TTI's can be done by simply applying an appropriate descrambling mask to the bit soft values before combining the TBCC codewords across multiple TTIs.

Proposal 2: eNB signaling the MI/SI validity interval or expiration time is considered. The MI/SI validity or expiration time is not affected by changes of the AB flag, SFN and H-SFN. The exact signaling method is FFS.

6. REFERENCES

[1] RP-170852, "Further NB-IoT enhancements", RAN #75, source Huawei, HiSilicon, Neul, 6-9 March, 2017.

[2] R1-1705188, "On system acquisition time reduction", RAN1#88b, source Ericsson, 3-7 April, 2017.

[3] R1-152190, PBCH repetition for MTC, Ericsson, RAN1#80bis.
[4] 3GPP TR45.820 Cellular system support for ultra-low complexity and low throughput Internet of Things (CIoT)

The invention claimed is:

1. A method for reducing system information (SI) acquisition time, the method being performed by a network node and comprising:
   signaling a validity interval to a user equipment (UE) via a first System Information Block (SIB), the validity interval comprising at least one of 3 hours or 24 hours;
   generating a master information block (MIB) comprising a one bit information element providing an indication that information included in a SIB1-BR has not changed within the validity interval, wherein the information comprises a systemInfoValueTag and scheduling information of a plurality of SI messages; and
   transmitting the MIB to the UE, wherein the MIB is transmitted to the UE prior to the UE entering a sleep state, and wherein after waking up from the sleep state the validity interval indicates to the UE whether information included in the MIB is still valid.

2. The method of claim 1, further comprising, prior to generating the MIB, determining whether the information has changed within the last 24 hours.

3. The method of claim 1, further comprising:
   updating the information;
   setting an SI change flag to a first value to indicate that the information has changed;
   activating a timer that will expire when an amount of time has elapsed since the timer was activated, said amount of time being equal to 24 hours;
   as a result of the information being further updated while the timer is still running, resetting the timer so that the timer will expire when said amount of time has elapsed since the timer was reset; and
   after the timer expires, setting the SI change flag to a second value to indicate that the information has not changed within said amount of time, wherein the one bit information element included in the MIB is set equal to the value of the SI change flag.

4. A computer program product comprising a non-transitory computer readable medium storing a computer program comprising instructions, which, when executed on at least one processor, cause the at least one processor to carry out the method of claim 1.

5. A method for reducing system information (SI) acquisition time, the method being performed by a user equipment (UE) and comprising:
   receiving, from a network node, a validity interval via a System Information Block (SIB), the validity interval comprising at least one of 3 hours or 24 hours;
   receiving from the network node, a master information block (MIB) comprising a one bit information element, wherein the UE receives the MIB prior to entering a sleep state and stores a portion of the MIB; and
   after waking up from the sleep state and based on the value of the one bit information element, determining whether information included in a SIB1-BR has not changed within the validity interval wherein the information comprises a systemInfoValueTag and scheduling information of a plurality of SI messages.

6. A network node for reducing system information (SI) acquisition time, the network node being adapted to:
   signal a validity interval to a user equipment (UE) via a first System Information Block (SIB), the validity interval comprising at least one of 3 hours or 24 hours;
   determine whether information included in a SIB1-BR has changed within the validity interval, wherein the information comprises a systemInfoValueTag and scheduling information of a plurality of SI messages;
   generate a master information block (MIB) comprising a one bit information element providing an indication whether the information has changed; and
   transmit the MIB to the UE, wherein the MIB is transmitted to the UE prior to the UE entering a sleep state, and wherein after waking up from the sleep state the validity interval indicates to the UE whether information included in the MIB is still valid.

7. A user equipment (UE) for reducing system information (SI) acquisition time, the UE being adapted to:
   receive, from a network node, a validity interval via a System Information Block (SIB), the validity interval comprising at least one of 3 hours or 24 hours;
   receive, from the network node, a master information block (MIB) comprising a one bit information element, wherein the UE receives the MIB prior to entering a sleep state and stores a portion of the MIB; and
   after waking up from the sleep state and based on the value of the one bit information element, determine whether information included in a SIB1-BR has not changed within the validity interval, wherein the information comprises a systemInfoValueTag and scheduling information of a plurality of SI messages.

* * * * *

UNITED STATES PATENT AND TRADEMARK OFFICE
CERTIFICATE OF CORRECTION

PATENT NO. : 11,356,928 B2
APPLICATION NO. : 16/611045
DATED : June 7, 2022
INVENTOR(S) : Wang et al.

It is certified that error appears in the above-identified patent and that said Letters Patent is hereby corrected as shown below:

On the Title Page

Item (57), in Column 2, Line 3, delete "which indication" and insert -- where indication --, therefor.

On Page 2, item (56), in Column 1, Line 2, delete "NB-IOT" and insert -- NB-IoT --, therefor.

On Page 2, item (56), in Column 1, Line 8, delete "Zte," and insert -- ZTE, --, therefor.

On Page 2, item (56), in Column 2, Line 25, delete "2016 .(1 page)." and insert -- 2016. (1 page). --, therefor.

On Page 2, item (56), in Column 2, Line 32, delete "China" and insert -- China; --, therefor.

On Page 2, item (56), in Column 2, Line 35, delete "#88bis R1 -1705188," and insert -- #88bis, R1-1705188, --, therefor.

On Page 2, item (56), in Column 2, Line 37, delete "Ericson" and insert -- Ericsson --, therefor.

On Page 2, item (56), in Column 2, Line 48, delete "NB-IOt"," and insert -- NB-IoT", --, therefor.

In the Drawings

In Fig. 2, Sheet 2 of 11, for Tag "204", in Line 2, delete "SIB," and insert -- SIB. --, therefor.

In the Specification

In Column 1, Line 9, delete "PCT/1B2018/053092," and insert -- PCT/IB2018/053092, --, therefor.

In Column 1, Line 12, delete "filed on filed on" and insert -- filed on --, therefor.

Signed and Sealed this
Twenty-third Day of May, 2023

Katherine Kelly Vidal
*Director of the United States Patent and Trademark Office*

CERTIFICATE OF CORRECTION (continued)
U.S. Pat. No. 11,356,928 B2

In Column 2, Line 52, delete "reading)." and insert -- reading. --, therefor.

In Column 3, Line 56, delete "detail" and insert -- detailed --, therefor.

In Column 4, Line 9, delete "architecture" and insert -- architectural --, therefor.

In Column 4, Lines 57-58, delete "Narrowband Physical Downlink Shared Channels (PDSCH)," and insert -- Narrowband Physical Downlink Shared Channels (NPDSCH), --, therefor.

In Column 5, Line 18, delete "configuration (RRC)" and insert -- control (RRC) --, therefor.

In Column 5, Line 20, delete "SIBS:" and insert -- SIB5: --, therefor.

In Column 5, Line 39, delete "configuration (RRC)" and insert -- control (RRC) --, therefor.

In Column 6, Line 38, delete "Consider" and insert -- Considering --, therefor.

In Column 6, Line 41, delete "uncertainly" and insert -- uncertain --, therefor.

In Column 6, Line 65, delete "down-link" and insert -- downlink --, therefor.

In Column 7, Line 1, delete "go-to-sleep"" and insert -- "go-to-sleep" --, therefor.

In Column 7, Line 5, delete "during sent in" and insert -- sent during --, therefor.

In Column 7, Line 14, delete "necessary to occupied" and insert -- necessarily to occupy --, therefor.

In Column 7, Line 15, delete "partial" and insert -- part --, therefor.

In Column 7, Line 41, delete "interested," and insert -- interested in, --, therefor.

In Column 7, Line 67, delete "read" and insert -- reading --, therefor.

In Column 8, Line 5, delete "MasterinformationBlock-NB" and insert -- MasterInformationBlock-NB --, therefor.

In Column 8, Line 32, delete "40.96 s" and insert -- 40.96 sec --, therefor.

In Column 8, Line 35, delete "MasterinformationBlock-NB" and insert -- MasterInformationBlock-NB --, therefor.

In Column 8, Lines 39-40, delete "MasterinformationBlock-NB" and insert -- MasterInformationBlock-NB --, therefor.

In Column 8, Line 52, delete "signal" and insert -- signaled --, therefor.

CERTIFICATE OF CORRECTION (continued)
U.S. Pat. No. 11,356,928 B2

In Column 8, Line 65, delete "is extended is extended," and insert -- is extended, --, therefor.

In Column 9, Line 8, delete "period 40.96 sec" and insert -- period of 40.96 sec --, therefor.

In Column 9, Line 19, delete "5 G" and insert -- 5G --, therefor.

In Column 9, Lines 33-34, delete "Narrowband Physical Downlink Shared Channel (PDSCH)" and insert -- Narrowband Physical Downlink Shared Channel (NPDSCH) --, therefor at each occurrence throughout the patent.

In Column 10, Line 29, delete "SIB s" and insert -- SIBs --, therefor.

In Column 10, Line 34, delete "enhanced access class barring (EAB)" and insert -- enhanced access barring (EAB) --, therefor.

In Column 11, Line 34, delete "timer" and insert -- time --, therefor.

In Column 12, Line 6, delete "operation," and insert -- operations, --, therefor.

In Column 16, Line 41, delete "UEs);" and insert -- UEs; --, therefor.

In Column 17, Line 32, delete "claim A7," and insert -- embodiment A7, --, therefor.

In Column 18, Line 5, delete "system information (SIB)" and insert -- system information block (SIB) --, therefor.

In Column 18, Line 20, delete "system information (SIB)" and insert -- system information block (SIB) --, therefor.

In Column 21, Line 54, delete "dependent of" and insert -- dependent on --, therefor.

In Column 21, Line 60, delete "is use" and insert -- uses --, therefor.

In Column 21, Line 65, delete "$C(x_1)=w_1$," and insert -- $C(x_i)=w_i$, --, therefor.

In Column 23, Line 60, delete "Consider" and insert -- Considering --, therefor.

In Column 23, Line 63, delete "uncertainly" and insert -- uncertain --, therefor.

In Column 24, Line 18, delete "sophisticate" and insert -- sophisticated --, therefor.

In Column 25, Line 4, delete "(CIoT)" and insert -- (CIoT). --, therefor.

In the Claims

In Column 26, Line 4, in Claim 5, delete "receiving" and insert -- receiving, -- therefor.

In Column 26, Line 11, in Claim 5, delete "interval" and insert -- interval, -- therefor.